US012770481B1

(12) United States Patent
Nager et al.

(10) Patent No.: US 12,770,481 B1
(45) Date of Patent: Oct. 20, 2026

(54) PLANNING UAV INSPECTIONS AND DISCOVERING SECURITY EVENTS AND ACTIVITIES USING IMAGE ANALYSIS AND GENERATIVE AI

(71) Applicant: Sunflower Labs Inc., San Carlos, CA (US)

(72) Inventors: Yannik S. Nager, Zürich (CH); Christian Eheim, Fällanden (CH); Alexander S. Pachikov, San Carlos, CA (US)

(73) Assignee: Sunflower Labs Inc., San Carlos, CA (US)

( * ) Notice: Subject to any disclaimer, the term of this patent is extended or adjusted under 35 U.S.C. 154(b) by 286 days.

(21) Appl. No.: 18/429,501

(22) Filed: Feb. 1, 2024

Related U.S. Application Data

(63) Continuation-in-part of application No. 17/194,386, filed on Mar. 8, 2021, now Pat. No. 11,915,481.

(60) Provisional application No. 62/990,659, filed on Mar. 17, 2020.

(51) Int. Cl.
*G08B 13/196* (2006.01)
*B64U 10/13* (2023.01)
*B64U 101/31* (2023.01)

(52) U.S. Cl.
CPC ....... *G08B 13/19613* (2013.01); *B64U 10/13* (2023.01); *B64U 2101/31* (2023.01)

(58) Field of Classification Search
CPC .............. G08B 13/19613; B64U 10/13; B64U 2101/31
See application file for complete search history.

(56) References Cited

U.S. PATENT DOCUMENTS

| | | | | |
|---|---|---|---|---|
| 9,505,494 | B1 * | 11/2016 | Marlow | G05D 1/0011 |
| 9,665,777 | B2 * | 5/2017 | Naikal | G06V 20/52 |
| 9,746,353 | B2 * | 8/2017 | Winter | G01S 13/88 |
| 2013/0265379 | A1 * | 10/2013 | Jia | H04M 3/493 348/14.04 |
| 2014/0249693 | A1 * | 9/2014 | Stark | G08G 5/32 701/2 |

(Continued)

OTHER PUBLICATIONS

Aicha Idriss Hentati and Lamia Chaari Fourati, Mobile Target Tracking Mechanisms Using Unmanned Aerial Vehicle: Investigations and Future Directions (Year: 2020).*

*Primary Examiner* — Dhaval V Patel
(74) *Attorney, Agent, or Firm* — Westborough IP Group, LLC

(57) ABSTRACT

Conducting surveillance in an area includes a UAV (Unmanned Aerial Vehicle) with a camera flying over specific portions of the area and capturing specific visual data based on a flight plan that indicates specific portions of the area that the UAV flies over and specific visual data to be captured by the UAV. A user provides natural language input for a customizable security query corresponding to a targeted instruction or a specific question. Generative artificial intelligence (AI) is used to interpret the natural language input to reflect the instruction or question by modifying the specific portions of the area that the UAV flies over and/or the specific visual data to be captured by the UAV. The generative AI is used to analyze the visual data provided by the UAV to derive results of surveillance of the area that include a response to the customizable security query.

22 Claims, 21 Drawing Sheets

(56) References Cited

U.S. PATENT DOCUMENTS

| | | | | |
|---|---|---|---|---|
| 2017/0083979 | A1* | 3/2017 | Winn | G06Q 20/102 |
| 2018/0253110 | A1* | 9/2018 | Tate | G05D 1/0607 |
| 2019/0258883 | A1* | 8/2019 | Britto Mattos Lima | G06V 20/13 |
| 2020/0096999 | A1* | 3/2020 | Pellerite | G06V 20/17 |
| 2022/0129017 | A1* | 4/2022 | Noguchi | H04N 5/222 |
| 2022/0338281 | A1* | 10/2022 | Kwon | H04W 8/26 |
| 2024/0412650 | A1* | 12/2024 | Wetzel | G08G 5/55 |

* cited by examiner

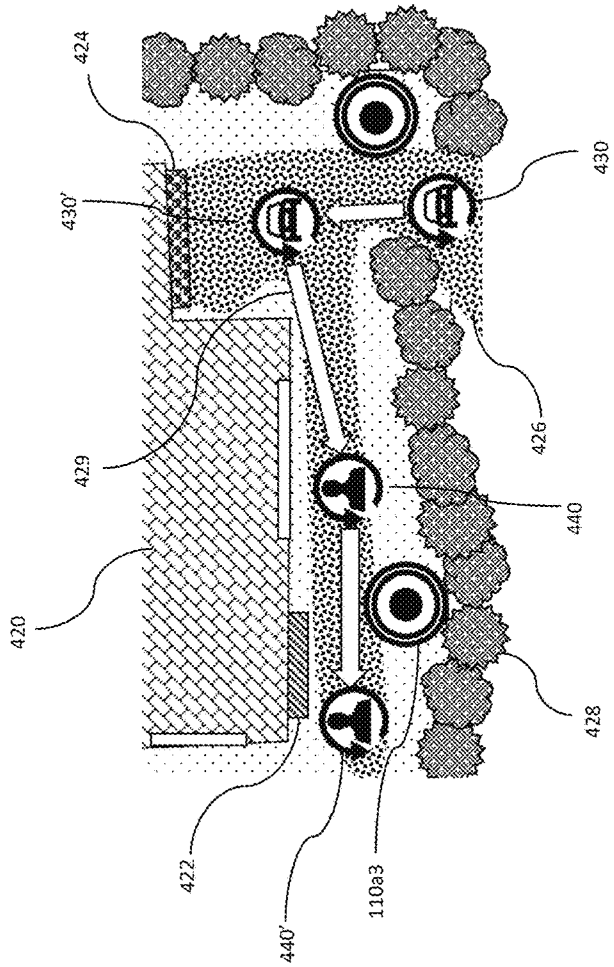
FIG. 4B. Event types: connected events (example 1)
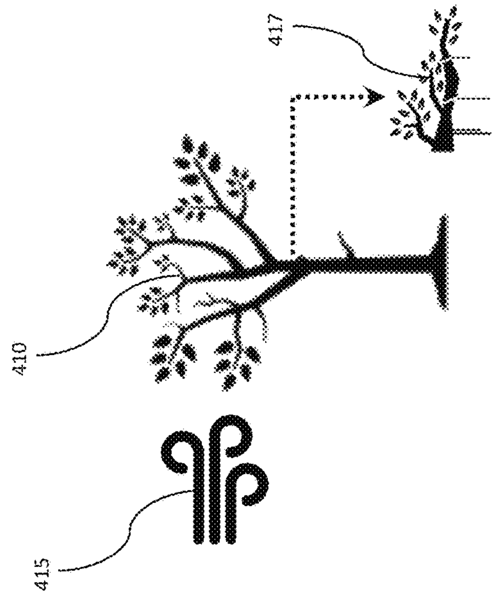
FIG. 4A. Event types: singular event

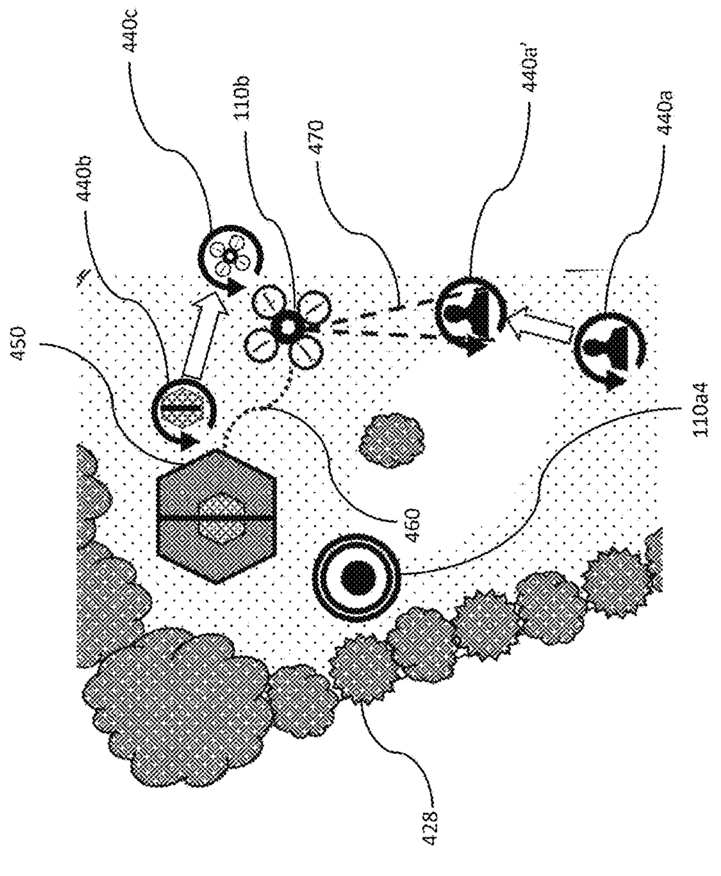
FIG. 4C. Event types: connected events (example 2)
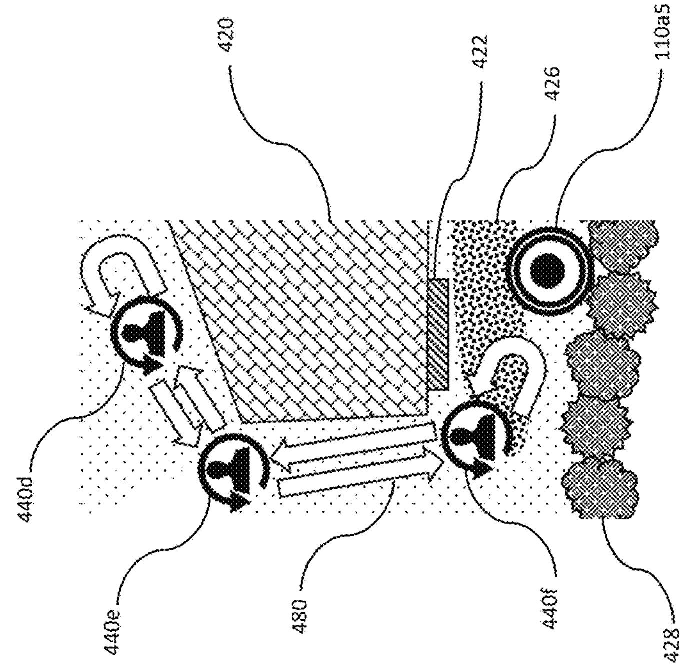
FIG. 4D. Event types: repetitive events

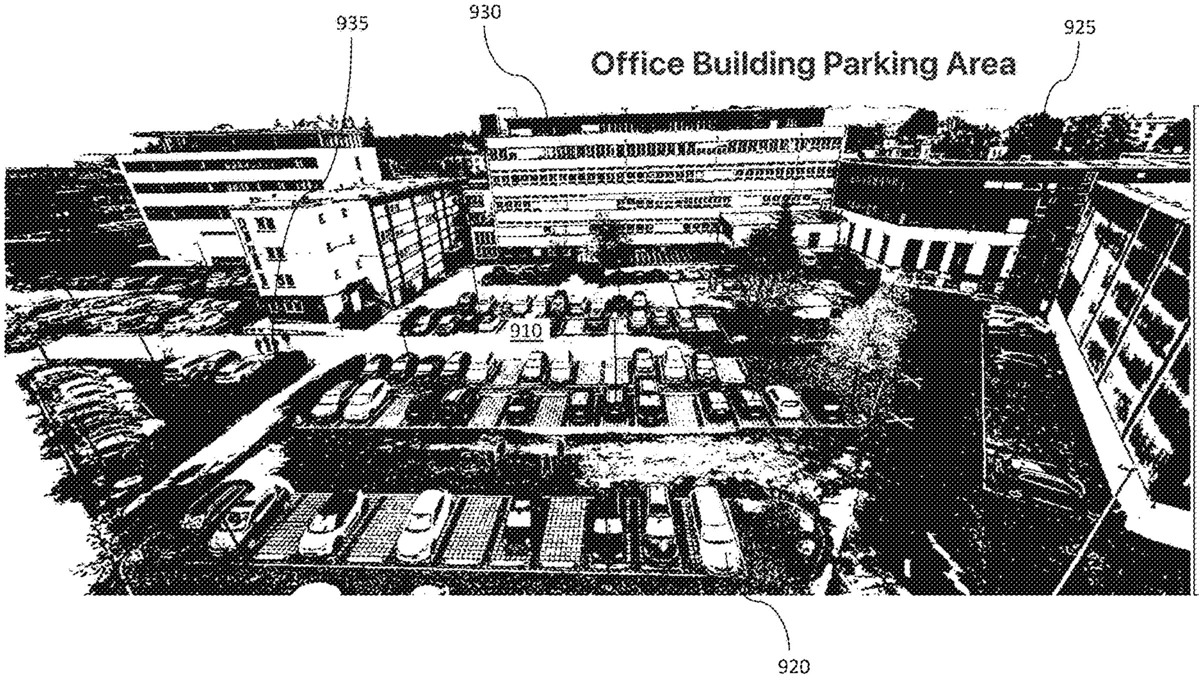

Title: "Office Building Parking Area" 940

Description:

Vehicles: "Numerous cars parked in a large outdoor parking area. Colors vary, mostly standard colors like white, black, and gray, with a few colored cars like red or blue."

Environment: "Autumn season with trees showing fall colors (yellows, reds). The landscape has a mix of deciduous trees with leaves in fall hues and evergreens."

Buildings: "Several multi- story office buildings, with white and dark facades, surround the parking area."

People: "A few individuals are visible walking through the parking area."

Weather: "It appears to be overcast, suggesting either early morning or inclement weather."

FIG. 9A

PLANNING UAV INSPECTIONS AND DISCOVERING SECURITY EVENTS AND ACTIVITIES USING IMAGE ANALYSIS AND GENERATIVE AI

CROSS-REFERENCE TO RELATED APPLICATIONS

This application is a continuation-in-part of pending U.S. patent application Ser. No. 17/194,386, filed on Mar. 8, 2021, and entitled “CAPTURING AND ANALYZING SECURITY EVENTS AND ACTIVITIES AND GENERATING CORRESPONDING NATURAL LANGUAGE DESCRIPTIONS”, which claims priority to U.S. Prov. App. No. 62/990,659, filed on Mar. 7, 2020, and entitled “CAPTURING, ANALYZING AND GENERATING NATURAL LANGUAGE DESCRIPTIONS FOR SECURITY EVENTS AND ACTIVITIES”, both of which are incorporated herein by reference

TECHNICAL FIELD

This application is directed to the field of information processing in the area of security systems, and more particularly to planning multicopter inspections and reporting security events and activities using image analysis and Generative AI.

BACKGROUND OF THE INVENTION

Following increased concerns about general and residential security, the market for home security systems is growing at accelerated pace. According to industry forecasts, the worldwide market for home security systems was valued at approximately $60 billion in 2019 and is expected to reach $74.75 billion by 2023 with a compound annual growth rate of 10.4%. North America represents the largest part of the market. Key players in the electronic security system products and services in the United States, are ADT, Vivint Inc., Nest Secure, Ring Alarm, SimpliSafe and many other companies, of which ADT is by far the largest vendor with over seven million installed units.

Electronic security requirements and solutions significantly vary for different types of dwellings ranging from tower blocks and regular apartment blocks to townhomes and private homes. Accordingly, security system providers have a large spectrum of offerings of electronic security products, systems, and services, varying from basic alarms to video surveillance (CCTV) solutions to multi-component solutions with different types of sensors and inspection capabilities. Such systems and solutions are implementing portions of the “Six D” security metaphor: Deter, Detect, Dispatch, Delay, Deny, Defend.

Differentiated assessments of market size for various residential security products take into account the existing demographics and property distribution by categories. According to the recent census data, there are roughly 76 million free-standing, owner or renter occupied, single family homes in the US, of which almost 56 million are located in lightly populated areas, outside of city centers and dense urban environments. Less than one in three of such properties currently have any type of a home security system, representing a significant unsatisfied demand for such systems in the US.

Recent developments in home security systems and services are gradually shifting their focus from video surveillance systems mounted solely on the house to protecting property security perimeter. Such protection often employs various types of sensors capable of detecting and distinguishing between different kinds of objects crossing the security perimeter and entering the property. For example, top recommendations by Amazon.com, Inc. issued in February 2020 for self-made home security systems with perimeter protection, include 12 sensors from six vendors, dominated by Guardline Wireless Driveway Alarm motion sensors. PIR (Passive Infrared), light, laser, tomographic, microwave, ultrasonic, vibration, seismic and other categories of motions sensors are increasingly used in home security systems. Camera vehicles for property inspection, like the Bee drone introduced by Sunflower Labs, Inc., paired with cloud solutions and smartphone-based mobile applications, are finding their way into integrated home security systems.

SUMMARY OF THE INVENTION

Some of the most challenging and least addressed problems faced by the new generation of home security systems are related to proper identification, recognition, and reporting of security events. Vendor information and customer feedback on perimeter protection and other types of home security systems indicate numerous potential and factual confusions and errors resulting from misidentification of objects and security threats, from overlapping of security perimeter with neighboring properties, etc. Additionally, multiple alert tones used in various systems, even when such tones are customizable, cannot adequately reflect the multiplicity and the complex relations between highly diverse security situations, threats, and damages.

Recent developments in Generative AI (GenAI) enabled an extensive image analysis with structured and non-structured descriptions of photographs and videos, object classification, retrieving object dynamics, producing, and interpreting natural language descriptions of objects, alerts, and notifications, determining object dynamics, etc. Applications of GenAI to security monitoring, especially when the monitoring involves a regular use of multicopters, requires further exploration and systematization of security notions, activities, and events, as well as new approaches to periodic and ad hoc multicopter inspections for property surveillance.

Accordingly, it is desirable to develop methods and techniques for planning multicopter inspections, and for identifying, analyzing, and reporting security events and activities using image analysis and Generative AI.

According to the system described herein, conducting surveillance in an area includes a UAV (Unmanned Aerial Vehicle) with a camera flying over specific portions of the area and capturing specific visual data based on a flight plan that indicates specific portions of the area that the UAV flies over and specific visual data to be captured by the UAV, a user providing natural language input for a customizable security query corresponding to a targeted instruction or a specific question, using generative artificial intelligence (AI) to interpret the natural language input to reflect the instruction or question corresponding to the customizable security query by modifying the specific portions of the area that the UAV flies over and/or the specific visual data to be captured by the UAV, and using the generative AI to analyze the visual data provided by the UAV to derive results of surveillance of the area that include a response to the customizable security query. The customizable security query may cause the flight plan to be altered to capture different visual data. The natural language input may alter or replace at least one security rule that is used to generate security events based on the visual data. The user may provide the natural language input verbally. Verbal input by the user may be converted to text prior to the generative AI interpreting the natural language input. The natural language input may be a targeted instruction for an on-demand inspection. The natural language input may be a specific question for a count of specific items at a specific location. The specific items may be vehicles and/or storage containers. The UAV may be a multicopter.

According further to the system described herein, creating or modifying security rules that are used to detect security events in an area based on visual data from a UAV (Unmanned Aerial Vehicle) that flies over portions of the area includes generating an initial flight plan that directs the UAV to fly over portions of the area to capture the visual data, the UAV collecting the visual data while flying over the portions of the area according to the initial flight plan, using generative artificial intelligence (AI) to analyze the visual data and detect suspicious activity therein at specific ones of the portions of the area based on the visual data, and creating or modifying the security rules to detect security events based on the visual data from the portions of the area in response to the generative AI detecting suspicious activities. Creating or modifying the security rules may also include dispatching the UAV to fly over specific ones of the portions of the area to capture the specific visual data in response to the generative AI detecting suspicious activity. Creating or modifying the security rules may also include revising the initial flight plan to provide a revised flight plan for dispatching the UAV over different portions of the area and/or to capture different visual data in response to the generative AI detecting suspicious activity. Creating or modifying the security rules may also include causing the UAV to fly over different portions of the area that deviate from the initial flight plan and/or to capture different visual data in response to the generative AI detecting suspicious activity. Creating or modifying the security rules may also include using generative AI to establish a baseline of visual data and activity for the area and creating or modifying the security rules in response to the visual data and/or the activity for the area deviating significantly from the baseline. The UAV may be a multicopter.

According further to the system described herein, dispatching a UAV (Unmanned Aerial Vehicle) with a camera to search an area includes formulating a target based on an image and/or a textual description of at least one object, dispatching the UAV to fly over portions of the area to capture visual data, and using generative artificial intelligence (AI) to analyze the visual data to determine if any of the visual data matches the target. Dispatching the UAV with a camera may also include terminating searching the area in response to the visual data matching the target object with sufficient recognition accuracy and/or passage of a predetermined amount of time. Dispatching the UAV may also include optimizing a flight path to minimize a possibility of missing the object if the object is moving. Dispatching the UAV may also include the UAV following the object to improve accuracy of matching the at least one object with visual data obtained by the camera of the UAV. Determining if any of the visual data matches the target may be performed by on-board capabilities of the UAV. Determining if any of the visual data matches the target may be performed by remote processing that is separate from the UAV. The UAV may be dispatched to strategic locations that correspond to a subset of the portions of the area where the target is expected to be found. The UAV may be a multicopter.

According further to the system described herein, a non-transitory computer readable medium contains software that conducts surveillance in an area using a UAV (Unmanned Aerial Vehicle) with a camera flying over specific portions of the area and capturing specific visual data based on a flight plan that indicates specific portions of the area that the UAV flies over and specific visual data to be captured by the UAV where a user provides natural language input for a customizable security query corresponding to a targeted instruction or a specific question. The software includes executable code that uses generative artificial intelligence (AI) to interpret the natural language input to reflect the instruction or question corresponding to the customizable security query by modifying the specific portions of the area that the UAV flies over and/or the specific visual data to be captured by the UAV. The software also includes executable code that uses the generative AI to analyze the visual data provided by the UAV to derive results of surveillance of the area that include a response to the customizable security query. The customizable security query may cause the flight plan to be altered to capture different visual data. The natural language input may alter or replace at least one security rule that is used to generate security events based on the visual data. The user may provide the natural language input verbally. Verbal input by the user may be converted to text prior to the generative AI interpreting the natural language input. The natural language input may be a targeted instruction for an on-demand inspection. The natural language input may be a specific question for a count of specific items at a specific location. The specific items may be vehicles and/or storage containers. The UAV may be a multicopter.

According further to the system described herein, a non-transitory computer readable medium contains software that creates or modifies security rules that are used to detect security events in an area based on visual data from a UAV (Unmanned Aerial Vehicle) that flies over portions of the area where an initial flight plan directs the UAV to fly over portions of the area to capture the visual data and the UAV collects the visual data while flying over the portions of the area according to the initial flight plan. The software includes executable code that uses generative artificial intelligence (AI) to analyze the visual data and detect suspicious activity therein at specific ones of the portions of the area based on the visual data. The software also includes executable code that creates or modifies the security rules to detect security events based on the visual data from the portions of the area in response to the generative AI detecting suspicious activities. The software may also include executable code that dispatches the UAV to fly over specific ones of the portions of the area to capture the specific visual data in response to the generative AI detecting suspicious activity. The software may also include executable code that revises the initial flight plan to provide a revised flight plan for dispatching the UAV over different portions of the area and/or to capture different visual data in response to the generative AI detecting suspicious activity. The software may also include executable code that causes the UAV to fly over different portions of the area that deviate from the initial flight plan and/or to capture different visual data in response to the generative AI detecting suspicious activity. The software may also include executable code that uses generative AI to establish a baseline of visual data and activity for the area and executable code that creates or modifies the security rules in response to the visual data and/or the activity for the area deviating significantly from the baseline. The UAV may be a multicopter.

According further to the system described herein, a non-transitory computer readable medium contains software that dispatches a UAV (Unmanned Aerial Vehicle) with a camera to search an area. The software includes executable code that formulates a target based on an image and/or a textual description of at least one object, executable code that dispatches the UAV to fly over portions of the area to capture visual data, and executable code that uses generative artificial intelligence (AI) to analyze the visual data to determine if any of the visual data matches the target. The software may also include executable code that terminates searching the area in response to the visual data matching the target object with sufficient recognition accuracy and/or passage of a predetermined amount of time. The software may also include executable code that optimizes a flight path to minimize a possibility of missing the object if the object is moving. The UAV may follow the object to improve accuracy of matching the at least one object with visual data obtained by the camera of the UAV. Determining if any of the visual data matches the target may be performed by on-board capabilities of the UAV. Determining if any of the visual data matches the target may be performed by remote processing that is separate from the UAV. The UAV may be dispatched to strategic locations that correspond to a subset of the portions of the area where the target is expected to be found. The UAV may be a multicopter.

The proposed system sets up, automates and executes security inspection plans and processes for regular and on-demand multicopter inspections of a monitored space and of dedicated security zones within the monitored space; automates and executes processing of captured video data and security reporting using image analysis, including the capabilities of Generative AI systems; offers natural language customizable security queries, targeted activity monitoring, and detection of changes via routine surveillance for the inspection planning and execution phase; and offers targeted search and recognition, selective security alert configurations, and voice-assisted activity narration for the security reporting phase.

Various aspects of system functioning are explained as follows:

A. Monitored space. A monitored space may represent an enterprise (industrial or other), private, federal, or municipal property where the proposed system serves as a component of a security solution, or a complete solution. The monitored space may be further divided into security zones, which may be spatially overlapping and are designated to provide distributed or specific security monitoring. A monitored space may be included into a larger surrounding area, such as a landscape or other natural environment. Portions of the monitored space may be surrounded by physical or virtual security perimeters; the outer boundary of the monitored space may also represent a physical (at least partially) or a virtual security perimeter. The monitored space may be enclosed within a virtual geofence with a prohibition to monitor and/or capture the environment outside the geofence.

B. Objects. A monitored space may contain permanent objects and may be regularly or sporadically attended by transitory objects. Both the permanent and the transitory objects may be static or dynamic; for example, buildings in the monitored space are permanent static objects, containers brought to a storage facility are transitory static objects, bridge cranes are permanent dynamic objects, and cars in a parking lot are transitory dynamic objects.

A monitored space may carry natural objects (trees, mountains, elements—snow, ice, rainwater, and more) and man-made objects (pavement, buildings, equipment, cars, furniture, etc.). People may be placed into a separate category from the security monitoring standpoint; for some types of monitored spaces (for example, home properties in rural areas), animals may also form a separate category.

Objects may have properties (attributes, parameters) and behaviors, may form connected or disconnected groups, and spatial configurations (arrangements).

C. Security monitoring, security rules, security events. Broadly understood, the security of a monitored space may include significantly more than an unauthorized access to the territory by bad actors or unauthorized persons, harmful or criminal actions of the bad actors or unauthorized persons, and assembly. Security of a monitored space may also include different types of damages to objects in the monitored space, such as natural damages (e.g. a dangerous level of snow, ice or water on a road or a balcony), technical damages (a broken car blocking access to objects), organizational damages (a clutter of containers in an unloading area), and damages of mixed type.

Three prominent groups of security attributes include:

Security markers, such as fences, gates, signs, signals, warnings, uniforms;

Object identifiers: color coding, emblems and logos, license plates, special codes, etc.; and Lists of registered objects, such as a registry of a truck fleet or an access list of personnel for each security zone based on object identifiers.

Automated security control over a monitored space may be materialized through security rules defined as logical and semantic quantitative statements that reflect:

(i) a presence of an undesirable object(s) or of object(s) with undesirable parameters in certain security zones, or in the monitored space; and/or (ii) an occurrence of an undesirable object behavior in groups and/or configurations, in certain security zones, or in the monitored space.

Examples of Security Rules:

(a) An unregistered person enters/approaches a security zone that allows only registered personnel.

(b) A private car occupies a parking spot reserved for the police or emergency vehicles.

(c) Recently unloaded containers in a storage facility block access to incoming vehicles.

(d) Debris caused by a strong wind clutters a gutter causing the rainwater to fall directly on an unloading vehicle with unprotected trunk.

Security events are occurrences of fulfilled security rule(s), i.e. situations when at least one of the conditions (i) or (ii) for an at least one of the established security rules is satisfied.

Using formal notations, a security rule $\mathbb{R}$ can be described as follows:

$$\mathbb{R}=(\mathbb{P},\mathbb{T},\mathbb{G}_{\mathbb{T}},\mathbb{Z}_{\mathbb{R}},\mathbb{Z}_{\mathbb{T}}\,\mathbb{C}_{\mathbb{R}}(\mathbb{P},\mathbb{T}\,\mathbb{G}_{\mathbb{T}}),\ \mathbb{B}(\mathbb{C}_{\mathbb{R}}(\cdot)),\mathbb{H}),$$

where $\mathbb{P}$ is a set of permanent objects associated with the rule;

$\mathbb{T}$ is a set of transitory objects associated with the rule;

$\mathbb{G}_{\mathbb{T}}$ is a set of groupings, configurations and arrangements of transitory objects associated with the rule;

$\mathbb{Z}_{\mathbb{R}}$ is a set of security zones where the rule may be applied;

$\mathbb{Z}_{\mathbb{T}}$ is a set of zones where, according to the rule, certain transitory objects are prohibited (the set includes all combinations of mutually non-allowed zones vs. transitory objects);

$\mathbb{C}_{\mathbb{R}}$ CR is a set of object attributes (characteristics) for permanent and transitory objects, configurations and arrangements, and relations between the above entities associated with the rule;

$\mathbb{B}(\mathbb{C}_{\mathbb{R}})$ is a set of object behaviors associated with the rule and described in terms of functional dependencies between objects and their attributes;

$\mathbb{R}$ is a set of descriptions and parameters of hints (cues, early signs) associated with the rule and indicative of a potential security event associated with the rule; such descriptions may be used during surveillance, for example, general presence of unidentified and uncategorized objects in a monitored space.

D. Proximities, security monitoring. Each security rule $\mathbb{R}$ has an associated set of security events $\mathbb{E}(\mathbb{R})$ occurring when the rule $\mathbb{R}$ is fulfilled; conversely, each security event $\mathbb{E}$ has an associated set of security rules $\mathbb{R}(\mathbb{E})$ allowing to track the occurrence of the security event $\mathbb{E}$. The practical method of monitoring (tracking, assessing) security rules and events may be implemented through proximities $\vec{\mathcal{E}}(\mathbb{E}, \mathbb{R})$, estimating the value of a security rule in terms of degrees of closeness of the value to each of the corresponding security events; the proximity value $\vec{\mathcal{E}}(\mathbb{E}, \mathbb{R})$ is a vector entity, which may be measured in distance, time, location coordinates, temperature, and other physical measurement units and may be also interpreted as an assessment of a security threat.

For example, if an undesired transitory object is approaching a crossing of perimeters of two security zones (for instance, two fences having nearby gates in each of the zones) and is tracked by a multicopter, then the proximities may be alternatively assessed by two distances between the object and each of the gates or by two estimated times when the object (given the object speed and assuming it won't change) may reach each of the gates.

Security monitoring is a complex of activities aimed at detecting, preventing, and addressing security events.

Examples of Security Monitoring Categories:

I. Presence and activity monitoring—ensuring that undesired objects do not breach security perimeters and appear in security zones where presence of the undesired objects is prohibited, or that undesired activities don't take place with or without breaching security perimeters (see security rules (a), (b) in the above examples).

II. Configuration monitoring—making sure that mutual dispositions and area densities of objects don't prevent normal functioning within a security zone or a monitored space (security rule (c) is a member of this category)

III. Shape monitoring—ensuring that permanent objects don't suffer from the natural or artificial additions that change a shape of the objects, such additions may include snow, ice, natural or man-made debris, etc. (security rule (d))

E. Multicopter-based security monitoring. Multicopter based UAVs (unmanned aerial vehicles) are continuously or episodically capturing visual appearance of the monitored space during flights of the multicopters over the space or over certain security zones, allowing the system to assess the status of security rules and detect or forecast security events through AI-driven image analysis of the captured videos.

The two main types of multicopter-based security monitoring activities include scheduled inspections and on-demand inspections.

Scheduled inspections provide a systematic, periodically scheduled multicopter flight grid. Flight plans and instructions for scheduled inspections may include, for example:

Assessment of the full set or a subset of the established security rules for a given security zone or for the whole monitored space.

General (exploratory) property monitoring and collecting visual materials for building an initial set of security rules (shortly after the start of a multicopter-based security monitoring project) or for augmenting the existing set of security rules (based on the multicopter exploitation experience and on the adaptation to changes in the monitored space).

On-demand inspections may be ordered in conjunction with a variety of relatively rare situations, for example:

When an immediate security threat or security event is suspected or has been independently detected (such as from weather forecasts, local police reports, personnel observations).

When a unique non-security event (for example, when a first run of a new type or model of equipment is conducted).

Accordingly, the on-demand inspections may have narrower plans based on specific security rules and on security or non-security events and activities within a monitored space.

Irrespective of the multicopter inspection type, each inspection flight has two distinct phases:

Scheduling, execution, video data capturing, and transmission.

Data analysis, reporting, and feedback.

Each of the phases may utilize a different set of technologies, including the AI technologies, as explained below.

Using formal notations, a scheduled multicopter-based inspection $\mathcal{I}$ can be described as follows:

$$\mathcal{I}=(\mathcal{T}\ \mathcal{P}\ \mathcal{R}),$$

where $\mathcal{T}$ is a time component, $\mathcal{P}$ is a flight (inspection) plan, and $\mathcal{R}$ is a flight report. The pair $\mathcal{M}(\mathcal{T}, \mathcal{P})$ is called an inspection manifest. The components of a multicopter inspection are further specified as $$\mathcal{T}=(\tau,\Delta_\tau,\vec{d}),$$

where $\tau$ is an originally scheduled start time of the inspection flight;

$\Delta_\tau$ is a time interval around the original start time where the factual start time may be randomly moved to avoid inspection predictability that may be potentially exploited by bad actors;

$\vec{d}$ is a span of durations of the inspection flight, where the lower boundary corresponds to the original scheduled value, and the upper boundary reflects maximal potential delays due to intermediate findings, weather, and other factors;

$$\mathcal{P}=(\mathbb{Z}_{\mathcal{P}}\ \mathbb{R}_{\mathcal{P}}\ \mathbb{I}_{\mathcal{P}}),$$

where $\mathbb{Z}_{\mathcal{P}}$ is one or more security zones that must be covered during the flight, including potentially the full monitored space;

$\mathbb{R}_{\mathcal{P}}$ is a set of security rules included in the flight plan that must be monitored during the inspection (see Section C for definitions and parameters of security rules; flight plan must ensure the compatibility between the inspected zone $\mathbb{Z}_{\mathcal{P}}$ and the parameters $\mathbb{Z}_{\mathbb{R}}$, $\mathbb{Z}_{\mathbb{T}}$ for each security rule and flight zone, as defined in Section C);

$\mathbb{I}_{\mathcal{P}}$ is a set of additional inspection instructions;

$$\mathcal{R}=(\mathbb{V}_{\mathcal{R}}\ \mathbb{A}_{\mathcal{R}}\ \mathbb{N}_{\mathcal{R}}),$$

where $\mathbb{V}_{\mathcal{R}}$ is a set of captured videos and photographs;

$\mathbb{A}_{\mathcal{R}}$ is a set of analytics derived during and after the inspection flight from the video data;

$\mathbb{N}_{\mathcal{R}}$ is a set of textual and/or voice narrations produced during or after the inspection flight as notifications and alerts (specified in more details in Section K below).

On-demand inspections are described similarly, with the exception of an inspection plan, which may be replaced with a different type of tasks, explained in the Sections F-I below.

F. Customizable security queries. Flight plans for the scheduled or the on-demand multicopter inspections may include customizable security queries entered as natural language by operators or other users. Such queries may have the format of targeted instructions or specific questions entered directly or adjusted from standard entries of security rules using an AI-supported natural language input. Natural language input for customizable search queries may be built as an add-on to Generative AI modules of existing systems, such as Chat GPT 4. A custom adaptation of the vocabulary for such add-on component may include special terms from the set of variables of a security rule $\mathbb{P}$, $\mathbb{T}$, $\mathbb{C}_{\mathbb{T}}$, $\mathbb{Z}_{\mathbb{R}}$, $\mathbb{Z}_{\mathbb{T}}$, $\mathbb{A}_{\mathbb{R}}$, $\mathbb{B}$ explained elsewhere herein.

Examples of Natural Language Entries for Targeted Instructions:

(a) Monitor unbadged and non-uniformed individuals entering Zone 1 or approaching perimeter of Zone 1 closer than 20 ft.

(b) Report more than 20 containers in loading area of Zone 3.

(c) Monitor for 10 minutes Zone 1 of airport long-term parking and count entering and exiting trucks.

(d) Monitor storage facility in Zone 2 for 30 minutes with stops at each door for 5 minutes.

(e) Fly around [the monitored space] and look for trucks with trailers unregistered on List 1.

(f) Replace Rule 5 for Zone 4 with the rule "Assess snow depths on the roofs of Buildings and on the driveways of Zone 4".

The first two entries (a)-(b) show targeted instructions associated with security rules for scheduled multicopter inspections. The entries (c)-(d) illustrate targeted instructions for scheduled exploratory multicopter inspections. The entry (e) shows a targeted instruction for an on-demand multicopter inspection associated with a security rule. The last entry (f) is an example of replacement of an existing rule in the flight plan. Note also that the entry (b) that requires reporting and hence is suitable for the real-time transmission, processing, and analysis of the captured video data, differs from the rest of the rules that are compatible with the off-line video processing offering deferred reporting. Note also that specific questions may be applied both to a specific flight plan and to analytics and statistical characteristics of multiple inspections.

The second format of customizable security queries, namely, the specific questions, may have natural language input created analogously to the targeted instructions. Specific questions may be used for clarifications and elaboration of accumulated knowledge from integrated databases of processed and/or raw video materials of multicopter surveillance or from real-time processing of an ongoing or just completed multicopter flight.

Examples of Natural Language Entries for Specific Questions:

(i) How many trucks on average have passed through the airport long-term parking gate within a 10-minute interval based on last week's surveillance?

(ii) Are there any vehicles stuck in the driveways of Zone 4?

(iii) How many open doors are at storage facility in Zone 2?

(iv) How many new security rules have been added for the monitored space last year?

The first question is related to the statistics of repetitive scheduled inspections (c) from the above list of targeted instructions. The second and the third questions, (ii) and (iii), inquire about specifics of the ongoing inspections (f) and (d) from the list of targeted instructions. Finally, the fourth question (iv) requires diving into specifics of numerous multicopter inspections and knowledge accumulation within a one-year period.

Note that the GenAI-driven processing mechanisms may analyze the visual data captured by a multicopter to provide a response to a customizable security query that answers a specific question or provides a response/result for a targeted instruction. For example, the GenAI-driven processing mechanisms may recognize the containers and count the number of containers in loading Zone 3 from the captured video frames to perform the targeted instruction (b), above, to report more than 20 containers in loading area of Zone 3.

G. Targeted activity monitoring. The purpose of targeted activity monitoring may be threefold:

Discovering security events and rules at an early stage of multicopter security monitoring. It may be a step in the process of building security rules using ad hoc visuals captured by a multicopter and AI descriptions of the scenes; the process may call for iterative observations as the nature of security events unfolds.

Identifying and forecasting security events during multicopter inspections. Targeted activity monitoring may collect hints and early signs of an upcoming security event and increasingly focus multicopter monitoring around the locations of increased security threats. Targeted activity monitoring may cause changes in sequential inspection schedules and/or initiate intermediate inspections on-demand.

Modifying the set of security rules and events based on security monitoring experience(s) or changes in security conditions.

Targeted activity monitoring may include the following components and phases:

Providing a list of suspicious behaviors/activities, presumed locations of the behaviors/activities, associated objects, and estimated durations.

Including locations, objects, and behaviors into a multicopter inspection plan (scheduled or on-demand).

Dispatching a multicopter according to the inspection (flight) plan to capture visual data around the proposed locations.

Processing collected data, identifying objects and activities, and assessing associated security risks.

If video data processing is conducted inline, synchronously with the multicopter inspections (in particular, onboard with the object and behavior recognition capability), the inspection process, including areas where the multicopter flies and the flight plan of the multicopter, may be modified during an inspection. Note that causing the multicopter to fly over different areas may include having the multicopter fly over different portions of the same security zone, having the multicopter fly over different security zone(s), or both. The suspicious activities may be viewed as prototypes of an initial or new security rules, gradually established through focused security surveillance, data analysis, and generalization.

H. Change detection via routine surveillance. This knowledge acquisition technique driven by multicopter surveillance and GenAI may be useful at an early discovery phase when security rules and events are built, as well as for modification of security rules and security event definitions, following major changes in permanent and/or transitory objects and in interaction processes of the objects.

The change detection process based on routine surveillance includes the following steps:

A set of permanent routes is established within the monitoring space or within some of the security zones.

Inspection schedules for each route are entered; flight plans include routine capturing of visual data along the routes.

Batches of captured materials for each permanent route for multiple inspection flights are processed to detect new or altered objects or conditions.

Multiple GenAI-driven processing mechanisms may be applied, with varying definitions of new and altered objects and conditions and with different roles of offline, inline, and onboard processing. In some instances, a flight plan may be altered to account for new and altered objects and conditions.

In some embodiments, the GenAI-driven processing mechanisms may be used to generate a baseline for the visual data in one or more of the security zones as well as a baseline for expected activity in the one or more security zones. The baseline may represent an expected state of the visual data for a security zone, including a state of permanent, immoveable objects (e.g., buildings) and a state of dynamic objects (e.g., people, that are expected in certain areas of the security zone at certain times). A significant deviation of from the baseline may trigger modification of security rules. The amount of deviation that is significant may be determined/set by a user and may vary depending on requirements of a user. For example, an activity baseline may take into account that employees arrive at a workplace at certain times. For a first user, it may be a significant deviation if anyone arrives at a time other than working hours. For a second user, one or two people arriving at a time other than working hours may not be significant, but three or more people arriving at a time other than working hours may be significant.

I. Targeted search and recognition. This feature of multicopter-based security monitoring enables search for objects matching specific descriptions in the whole monitored space or within a separate security zone or a list of security zones.

Given a textual description, a source image, or a text+image combination, the multicopter captures images and videos from the predefined strategic locations until one or more objects matching the description with a sufficient recognition accuracy are found, or until a predefined or operator-controlled search time has expired. This type of search is predominantly used for transitory objects and requires synchronous processing and analysis of captured images and videos via on-board capabilities or via remote processing of transmitted data. The feature includes a portion of calculations related to the area coverage, view angles, and timeouts. When searching for dynamic objects, the technique may include an optimization of the coverage path to minimize the chance of missing a moving object and may also include following search candidates for improving object recognition accuracy.

Note that the GenAI-driven processing mechanisms may determine that one or more objects match a description with a sufficient recognition accuracy based on functional criteria set, at least in part, by a user and may vary depending on requirements of the user. For example, in some cases, a description may correspond to a truck and sufficient recognition accuracy may be found when an object matches any truck. In other cases, sufficient recognition accuracy may only be found when the visual data includes a truck with specific characteristics (e.g., the name of a particular company written on a side thereof, a truck number within a company fleet, a license plate number, a model/brand of the vehicle, etc.).

Targeted search and recognition may represent a special type of on-demand multicopter inspections and may be used both at an early phase of a multicopter surveillance project to establish initial security rules and at an advanced surveillance deployment to address issues presented by security events and/or enhance security rules by adjusting object identification and definition requirements.

J. Semi-automatic building of security rules. Building security rules from scratch in a semi-automatic mode for a monitored space or a security zone may include the following steps:

(1) Using the techniques of change detection via routine surveillance, targeted activity monitoring, and targeted search and recognition (Sections G-I of the Summary) to create AI descriptions of the security zone (or a monitored space) from multiple video and photo materials.

(2) Compiling lists of permanent and transitory objects, their interactions, activities, and object behaviors (including configurations and arrangements of transitory objects).

For example:

a. [permanent] storage facility with three docks and flat roof, two cranes, driveway, parking slots, b. [transitory] trucks, trailers, cars, containers, personnel, c. [object behaviors, interactions] arriving, departing cars, cars entering, exiting docks, containers unloaded, loaded by cranes.

(3) Compiling vocabulary of relevant object parameters and sets of values.

For example:

a. storage facility>dimensions, capacity;

b. storage facility.port1>dimensions, c. {trucks, trucks, and trailers}>{registered license #s, allowed brands, allowed owners}.

(4) Enter natural language descriptions of security rules using lists and vocabulary from (2)-(3).

K. Reporting multicopter inspection results. Reporting multicopter inspection outcomes depend on the inspection type, features, and goals. Several prominent reporting options are listed below.

Instant reporting applies to inspections where immediate inspection results are required (security event, targeted search) and can be produced during the multicopter flight or shortly after completion of the multicopter flight; the inflight reporting demands an on-board image processing and analysis or a nearly synchronous wireless data transmission, processing, and image analysis of the transmitted data.

Reports may be delivered in analytical, descriptive (textual, visual, audio) and combined formats. Inspection results requiring instant actions may be translated into notifications and alerts with natural language descriptions.

A voice assisted narrative report may employ a voice synthesizer to verbally alert security personnel about security events, objects located during targeted search, and other urgent outcomes, narrating the AI-generated natural language descriptions for immediate awareness.

Simultaneously with an instant text, visual or voice reporting, an analytic portion of the report may be stored and processed for statistical, machine learning and other purpose.

For some types of multicopter inspection, instant reporting or even data processing are not required. Thus, deferred processing and data analysis may be used for routine surveillance aimed at change detection, explained in Section H of the Summary.

L. Extended sensor-enabled systems. An extended variant of the proposed system may integrate various types of sensors, smart home devices, and features of home networks, which capture data from multiple sources, such as sensors, multicopter inspections, smart home devices, presence and weather information, process data to identify security events and determine the type, location and timing of the events, monitor event progress, build event graphs and analyze the graphs to determine clusters of events and associated activities based on spatial, temporal and semantic associations between events, build activity descriptors, convert the activity descriptors into natural language descriptions of activities and periodically present notifications or reports to the property owner (or their agent) in a visual and/or synthesized audio format.

The proposed system may also include additional components and functionality representing different phases of the system workflow for an extended variant of the system that integrates various types of sensors, smart home devices, and features of home networks:

1. Data capturing
2. Object classification
3. Event generation
4. Building and analyzing an Event Graph
5. Identifying and monitoring activities
6. Conducting semantic analysis and building activity descriptors
7. Building activity descriptions in natural language
8. Reporting Each of the eight components for an extended variant of the system is explained below as follows:

Data capturing. The system continuously monitors the property within an outer perimeter of the property and possibly in close vicinity (such as a road adjacent to the property) and collects various types of data—in the first place, information on moving objects with a potential to raise security threats. The system may employ various data capturing mechanisms:

(i) different types of sensors (PIR, vibration, light, laser, ultrasonic, seismic, radar, etc.), potentially assembled in sensor units, distributed across the property, and measuring size, position, velocity, and other parameters of moving objects (humans, vehicles, animals, and other objects);

(ii) video streams from camera vehicles, such as multicopters (a.k.a. drones or UAVs—Unmanned Aerial Vehicles), used for property inspections;

(iii) smart home devices that may also be supplied with sensors, alarms and other detection and signaling means;

(iv) presence detection may include, for example, home based Wi-Fi networks identifying mobile devices, such as a smartphone; a detected device may be a known mobile device (an owner, an invited guest, a friend, a contractor, etc.) or an unknown mobile device, which may lead to different paths of assessing security threats.

(v) current weather data and weather forecasts; for example, strong winds or heavy rains may move objects on the property.

Object classification. Once the data capturing component has detected a new external object on the property (or a previously detected object in a new position and captured by partially or completely different sensors compared with the first detection), the system may attempt to identify and classify the object; below is an example of the identification and classification process:

(a) A dynamic sensor profile for the new object may be built, including object size (for instance, object height, measured by an array of sensors with capturing zones of the sensors tilted down/straight/up), velocity and vibration pattern.

(b) Smart home, presence, weather, and other captured data related to the new object may be added to the sensor profile.

(c) The combination of the captured and processed data may form an input to a pre-trained object classifier, which returns an object category, such as human, animal, vehicle, uncategorized object—a branch falling from a tree under a heavy wind or a splash in the pool from a stone thrown by a child, or ambient noise, such as shrubs moving in the breeze or a fence vibrating when vehicles are passing by the property.

Event generation. A security event may be associated with an external object (human, animal, vehicle, uncategorized object) or an internal object (camera vehicle dispatched for inspection, an owner or a member of an owner's family moving across the property, a doorbell or other signal, etc.) or both. A security event may have the following key object attributes: time, location on the property map, motion vector, object category, associated internal or external objects.

For example, if a car is entering the property's driveway, such an external object is characterized by a time of the event, a position of the car, the 'vehicle' category and the sensor unit(s) that have detected the car at the moment of the event and in the position of the car. In case the car stops, and a person comes out of the car and walks toward the front door, the person is characterized by the time, position, the motion vector (from the driveway to the front door), the 'human' category, the sensor units (same or different with sensor units used to detect the car) capturing the person and, if the person comes in proximity with a designated property's security hazard hotspot(s), by the relevant hotspot(s). If a camera vehicle, such as a multicopter, has been dispatched to capture a video of an external object on the property and leaves a landing platform of the multicopter, a corresponding multicopter event is characterized by the time, position, and an associated internal object of the landing platform. If a camera of the multicopter captures images of the object, the event might be augmented by the objects detected in the images.

The system may use a set of criteria based on various object attributes to determine whether the emergence and behavior of certain dynamic objects on the property leads to generation of a security event. Such determination is based on the location of a new object on the property map, timing, object category and interaction of the new object with internal objects and whether the new object indicates a potential security threat that warrants further monitoring of the object. Thus, in the above example of a car entering the property and a person walking across the property, if either a car or a driver (passenger) have been identified by the presence detection system, the system may identify the person as an owner's friend, invited guest, contractor, etc., and the security event may be discarded (although the security event may be still monitored for reporting and archiving purposes without issuing instant alerts); otherwise, a security event may be generated and stored for further processing. In another example, if a non-identified individual rings a doorbell, the system may not only generate a security event but may also elevate a security hazard level of the system and respond with an associated security monitoring event by dispatching a vehicle to capture video of the individual.

Building and analyzing an Event Graph. Many security events may be grouped into dynamic and causal chains, representing movement of certain objects across the property, interaction of the objects with each other and with internal objects and demonstrating growing or declining security threats, requiring proper monitoring and other actions. At the core of such monitoring lies an Event Graph, showing dynamic and semantic progression and interaction between events and objects.

For the purpose of monitoring, security events may be categorized as follows:

A. Singular events—sporadic, non-dynamic events that do not progress to a noticeable extent in time or by location. Examples include a tree, or a branch fallen by a strong wind or a splash from an object dropped in a swimming pool.

B. Connected events—dynamic events that follow each other in time and/or follow each other causally, the main body of nodes of the Event Graph, for example:

- Subsequent positions of a moving object discovered by different sensor units. Security events corresponding to a couple of adjacent positions may be connected if the security events are consistent with an ability of an object to reach a second position from a first one with an estimated object speed within a time interval separating the events.
- A car stopping on a property's driveway, followed by a person emerging from the car and walking across the property. The security event corresponding to the stopping car may be connected to the security event reflecting the first captured position of the person based on various criteria—for example, if the car was the only possible explanation of the captured position/time of the person who has not been located previously on the property.
- A sequence of events describing the functioning of a multicopter, dispatched for inspecting an object whose security events reach a certain level of security threat, may be connected both within the trajectory of the multicopter and with the external events. For example, the beginning event of the mission when the multicopter departs from a landing platform may be connected to the starting event of the proper inspection when the inspected object first appears in a field of view of a camera of the multicopter. At the same time, the aforementioned beginning event may be connected with the external event that caused the flight (the event associated with the external object raising security threat level), while the starting event of the proper inspection may be connected with another external event describing the inspected object at that point in time.

Connectivity rules between events direct the structure of the Event Graph. The connectivity rules may often be time sensitive, as shown by the above examples: in addition to following the connectivity logic explained in the previous example, two connected events should occur, for the most part, within a relatively narrow time window (for example, 30 seconds or three times an average interval between adjacent events within the same activity—see below on identifying and monitoring activities). If a security event, initially added to the Event Graph, is not followed by another event that follows the first event (chronologically or casually) within a reasonable timeframe, then the added event may instantly acquire the singular status, as explained and illustrated in section A above. If no new security events at all occurred within such time window (an inactivity threshold), the current connected component of the Event Graph may be closed, so that the first future event may start a new component of the Event Graph.

There is, however, a notable exception from the Event Graph decomposition into components separated by inactivity intervals of the predefined (or larger) length. Certain types of events may belong to suspended activities that may be resumed significantly later. For example, a racoon may enter the property in the daytime, sleep under a fence and start digging a trench in the nighttime. Therefore, the system may attempt associating some of the future event nodes with origins thereof in previous components, and vice versa.

In parallel with discovering new objects and connections and building the Event Graph, the system processes portions of the graph, such as connected components, attempting to cluster the connected components structurally and semantically.

Identifying and monitoring activities. The purpose of clustering the Event Graph is the identification and monitoring of activities defined as sequences of events, or processes, describing behavior of objects that may raise security threats, may (or must) cause adequate security measures and may require various levels of reporting.

The most typical activity format is a directed path on the Event Graph, representing subsequent security events for an external or an internal object. The length of such a path may depend on the density of sensor units, frequency of capturing object attributes and interactions between different objects, such as appearing in the proximity of a security hazard hotspot, ringing a doorbell, leaving a landing platform, starting/ending a video stream, etc.

More complex activities may include combinations of object path(s) and other interactions between single or multiple external and internal objects, for example, two individuals walking jointly around the house, then splitting their paths, followed by dispatching a multicopter to keep inspecting both individuals as long as the multicopter provides a sufficient video quality, and then switching to inspecting one of the individuals who is closer to the house.

The phase of identifying and monitoring activities may include specific transformations of the Event Graph, such as:

Detecting and discarding singular events, as explained elsewhere herein.

Identifying resumed (after being temporarily suspended) activities.

Recognizing repetitive events/paths/actions by external objects, such as an individual walking back and forth around the home.

Conducting semantic analysis and building activity descriptors. Semantic analysis of activities that have been detected at the previous phase pursues two different but interrelated goals: filtering/prioritizing the activities with respect to corresponding security threats and building activity descriptors for the subsequent synthesis of natural language descriptions.

Semantic analysis compresses activities to essential, key events of the activities, eliminating intermediate events. Key events may be associated with an object (a person, an animal, a vehicle, or an unidentified object) approaching, interacting with, or repetitively crossing the space near a security hazard hotspot; with the first detection of a new object by sensors, such as a vehicle first crossing a property gate when entering the property or leaving the property through the gate. Key events may also be generated by internal objects, for example, opening a multicopter landing platform, starting multicopter flight, reaching a target position by the multicopter and attaining a view of a potential security hazard, landing of the multicopter on the landing platform, etc.

For example, a walk of an unknown person through a property may be compressed to three key events:

First appearance at the property gate.

Reaching the front door.

Ringing the doorbell.

In a similar way, an inspection flight of a multicopter may be reduced to the following key events:

Leaving the landing platform.

Attaining view of an external object and starting video transmission.

Ending video transmission.

Returning to the landing platform.

The sequence of key events may serve as a descriptor for an activity.

Building activity descriptions in natural language. The system may convert activity descriptors into natural language descriptions using, for example, template-based grammar with a limited set of constructs, such as time/location/object type/action/connector, for example:

At 5:30 pm [time] a person [object type] walked [action] from the gate [location] to the front door [location] and [connector] rang the bell [action] at 5:33 pm [time].

At the same time [timing reference] the multicopter [object type] took off [action] from the landing platform [location] and [connector] inspected [action] the front door [location] at 5:34 pm [time].

Reporting. Activity descriptions may be presented to owners on demand (for example, on verbal requests to Alexa, Google Play, Siri, or other voice-enabled assistants) or as mandatory notifications, in real-time or buffered/archived, in visual (text, pictogram and other presentations), in synthesized voice formats, as periodic reports or conversational style notifications.

BRIEF DESCRIPTION OF THE DRAWINGS

Embodiments of the system described herein will now be explained in more detail in accordance with the figures of the drawings, which are briefly described as follows.

FIGS. 4A-4D are schematic illustrations of different event types, according to an embodiment of the system described herein.

FIGS. 9A-9B are schematic illustrations of GenAI-based image analysis of photographs and the resulting structured and non-structured descriptions of the scenes, according to an embodiment of the system described herein.

DETAILED DESCRIPTION OF VARIOUS EMBODIMENTS

The system described herein provides for planning multicopter inspections, identifying, analyzing, and reporting security events and activities using image analysis and Generative AI, capturing property security data from multiple sources, identifying and categorizing security events and associated activities, generating natural language descriptions of activities and presenting the descriptions as notifications or reports to the property owner in a visual and/or synthesized audio format.

Figure 1:
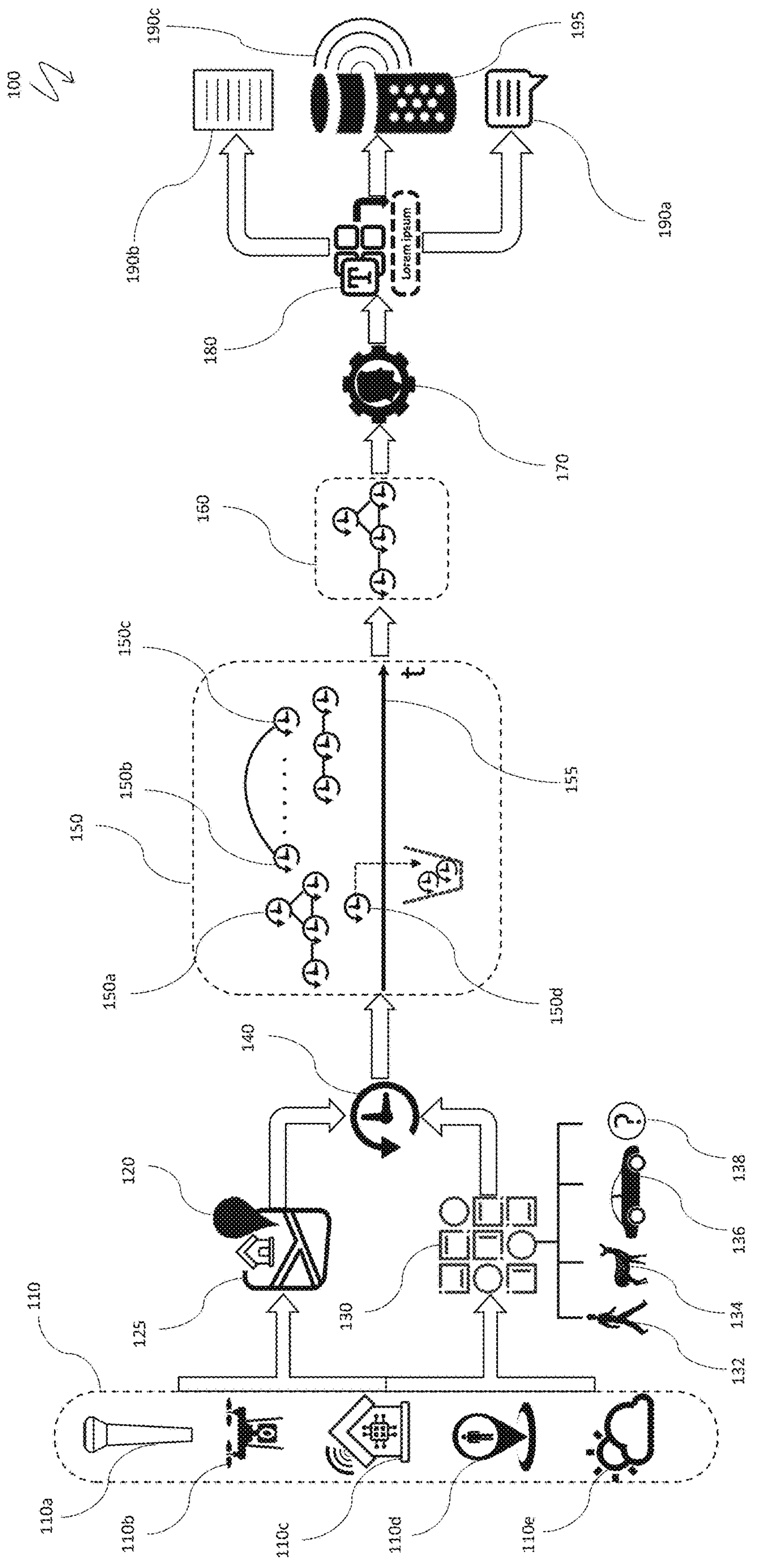
FIG. 1 is a schematic illustration of architecture and workflow of a system that captures and analyzes security events and activities and generates natural language descriptions, according to an embodiment of the system described herein.

FIG. 1 is a schematic illustration 100 of system architecture and workflow. Data collection mechanisms used by the system may include one or more sensor units 110*a*, a multicopter 110*b*, a smart home with multiple sensors, networks and other hardware and software 110*c*, presence detection mechanisms 110*d*, explained elsewhere herein, and weather forecast information 110*e*. For every discovered object, the system determines object location 120 on a property map 125 and provides static or dynamic object information to an object classification component 130, which may identify an object as a human 132, an animal 134, a vehicle 136 or report an unknown object type 138. Some objects observed by the system may generate events 140, which may be added to an event graph 150 on a timeline 155 thereof, which may lead to various situations: a new event may be added to a sequence of connected events 150*a*, may be qualified as a suspended event 150*b* or a resumed event 150*c*, or may be discarded as illustrated by an event 150*d*.

The connected events 150*a* may mature into activities 160, which may be subsequently studied by a semantic analysis component 170, which, in its turn, may transfer one or more of the activities 160 to a natural language description engine 180 for generating natural language notifications 190*a* and reports 190*b* that may be presented to a property owner (or agent thereof) in a text format or as synthesized speech 190*c* that may be played on demand or otherwise by a smart speaker 195.

Figure 2:
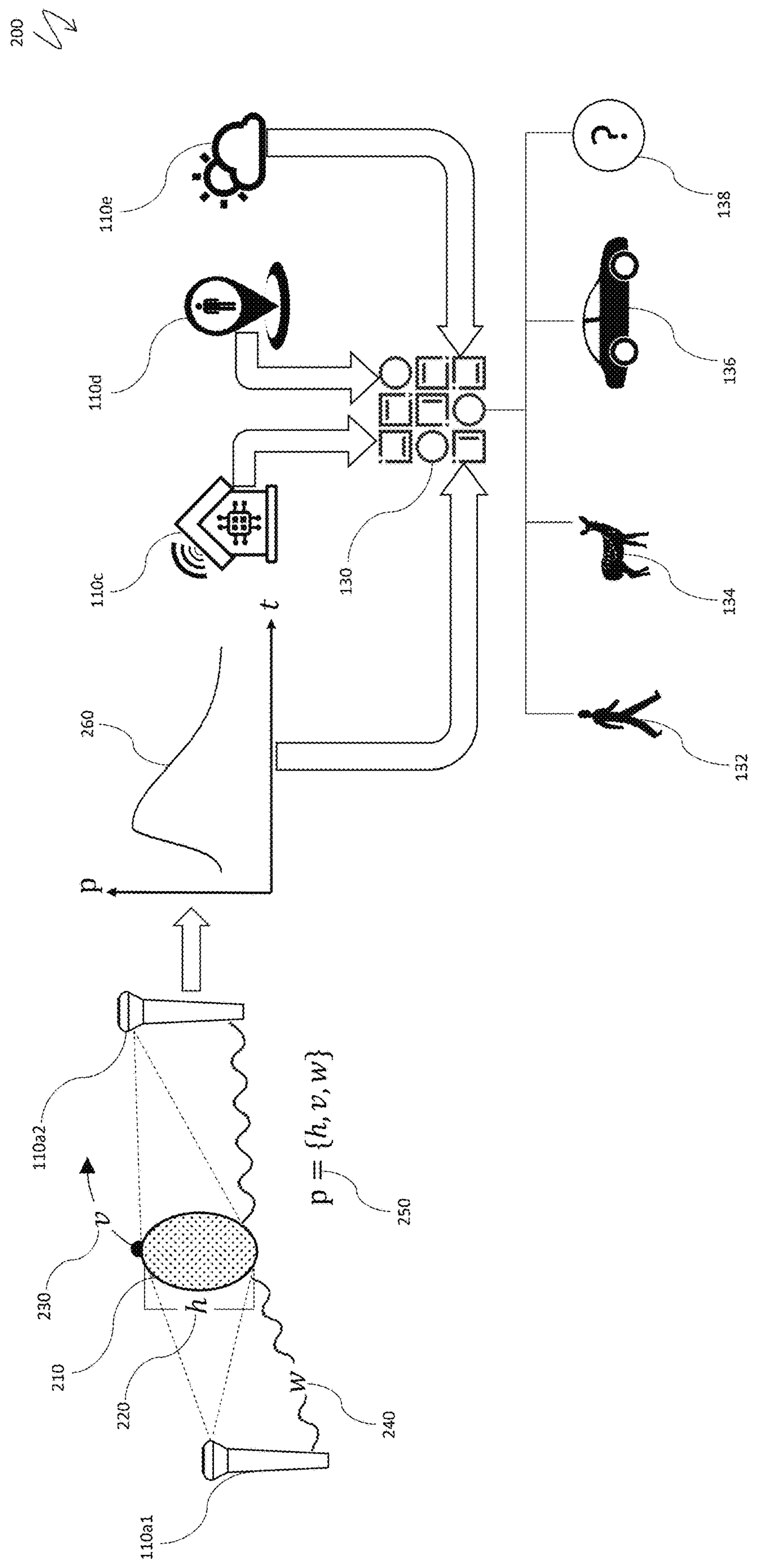
FIG. 2 is a schematic illustrations of object identification and classification, according to an embodiment of the system described herein.

FIG. 2 is a schematic illustration 200 of object identification and classification. Two sensor units 110*a*1, 110*a*2 are tracking an object 210 and dynamically assessing a height 220 of the object 210, a velocity 230 of the object 210 and vibration characteristics 240 of the object 210, which are combined into an object sensor profile 250, which results in a dynamic object profile 260. The dynamic object profile 260 represents one input to the classifier 130; by adding optional information about the object 210 captured by the smart home sensors 110*c*, presence detection mechanisms 110*d* and the weather forecast 110*e*, the system may build a comprehensive input for the classifier 130, which may subsequently assign the object 210 to one of a plurality categories for the classifier 130, such as the human 132, the animal 134, the vehicle 136 or the unknown object 138.

Figure 3:
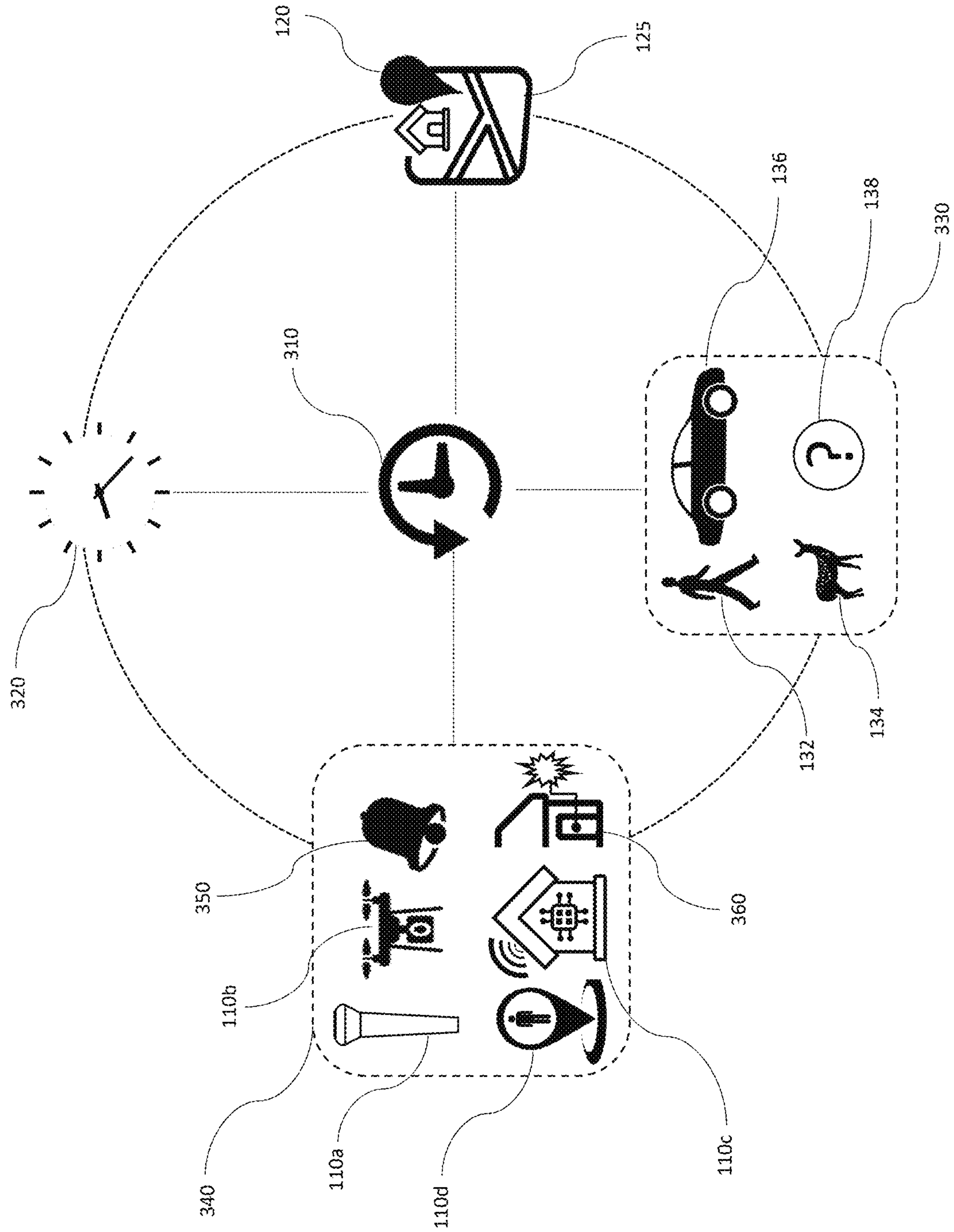
FIG. 3 is a schematic illustration of event attributes, according to an embodiment of the system described herein.

FIG. 3 is a schematic illustration 300 of event attributes, representing informational components of an event description. Once an event 310 is identified by the system, attributes of the event 310 may include all or some of the following parameters: a time stamp 320; the location 120 on the property map 125; an object category 330 associated with the event 310 with a value range corresponding to the human 132, the animal 134, the vehicle 136 and the unknown object 138; and one or more associated internal objects, such as one or more of the sensor units 110*a*, the multicopter 110*b*, the smart home system 110*c*, the presence detection mechanism 110*d*, a door bell or other signal 350 and a security hazard hotspot 360, for example, a front or garage door or a front or back window. When an event includes multiple objects, object attributes may be captured separately for each relevant object.

FIGS. 4A-4D are schematic illustrations of different event types.

FIG. 4A schematically illustrates a singular event where a branch 417 falls from a tree 410 on a property broken off by a strong wind 415.

FIG. 4B is a schematic illustration of connected events. Part of a property shown in FIG. 4B includes a house 420 with a front door 422, a garage door 424, a driveway 426 and a hedge 428. A vehicle enters the property via a driveway (an event 430) and stops near the garage door 424 (an event 430'). A person leaves the vehicle and walks along a wall to the front door 422 (events 440, 400'), which is captured by a sensor unit 110*a*3. The two events 430, 430' associated with a vehicle (entry and parking) and the two events 440, 440' associated with the person who exited the vehicle are connected and the system logic identifies the connected events as such.

FIG. 4C is another schematic illustration of connected events. A person walks through a property area inside a hedge 428 and is detected by a sensor unit 110*a*4, as shown by an event 440*a* associated with the person. According to system logic, the multicopter 110*b* is routed for inspection of a potential intruder. This causes a multicopter platform 450 to open (an event 440*b* associated with the multicopter platform 450) and the multicopter 110*b* flies along a trajectory 460 and reaches a target position observing the person as shown by a view angle 470, which is recorded by the system as an event 440*c* associated with the multicopter 110*b* and an event 440*a'* with the person. The events 440*a*, 440*a'*, 440*b*, 440*c* form a sequence of connected events.

FIG. 4D is a schematic illustration of repetitive events. A property area includes the house 420 with the front door 422, the driveway 426 and the hedge 428. The property area has an installed sensor unit 110*a*5, which may detect and track, on par with other sensor units not shown in FIG. 4D, various objects on the property area. A person enters the property area through the driveway 426 and walks back and forth around the house 420, as shown by arrows 480 and by a sequence of events 440*d*, 440*e*, 440*f* identified as the repetitive events.

Figure 5:
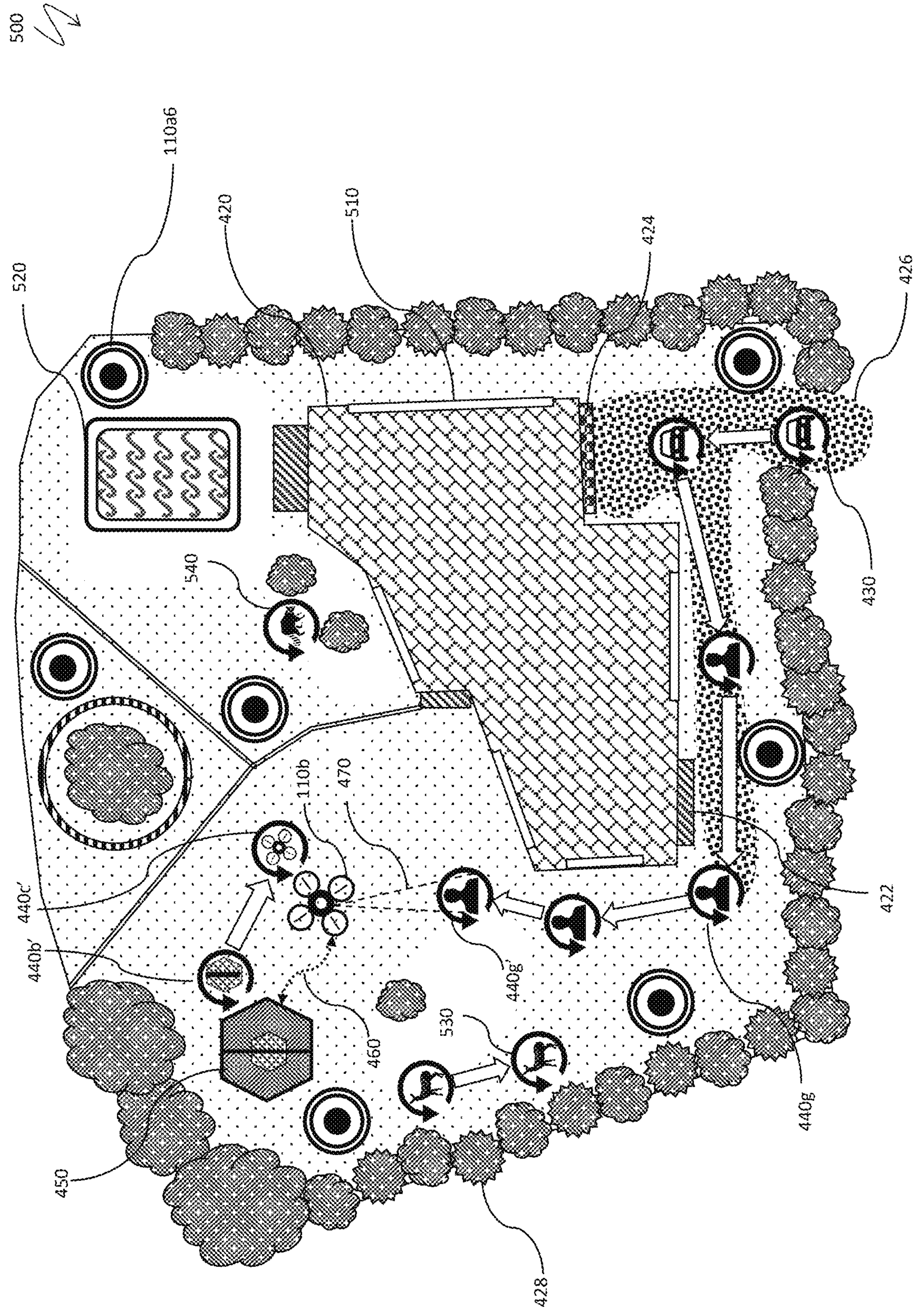
FIG. 5 is a schematic illustration of activities and events on a property, according to an embodiment of the system described herein.

FIG. 5 is a schematic illustration 500 of activities and events on a property. The property includes the house 420 with the front door 422, the garage door 424, a large window 510, the driveway 426 and a pool 520; the property is mostly surrounded by the hedge 428. There are multiple sensor units installed on the property, including a sensor unit 110*a*6. The multicopter 110*b* with the landing platform 450 allow aerial video inspections of the property.

A vehicle has entered the property and stopped near the garage, which is depicted by the starting event 430 related to the vehicle object; the vehicle activity may form a short activity with two events shown in FIG. 5. Subsequently, a vehicle driver or passenger comes out of the vehicle and starts walking along the property; this is shown by a sequence of events associated with a human object, two of which, 440*g* and 440*g'*, are marked in FIG. 5.

Once an event 440*g* occurs and the person, who is unknown, turns a corner and moves further into the property, the system deploys the multicopter 110*b* for inspection (see FIG. 4C and the accompanying text), which causes a Hive (the multicopter platform 450) to open and release a Bee (the multicopter 110*b*) to fly along the trajectory 460 to reach a target position for observation and video inspection (the view angle 470). This causes several connected events, as explained elsewhere herein, and activity by the multicopter 110*b* may be marked by a starting event 440*b'* and an intermediate event 440*c'*.

Tracking the unknown person, including a multicopter inspection, is not the only activity occurring on the property. An event 530 associated with an animal that has been subsequently recognized as a deer, may mark a start of an activity that might be reportable in instances where the deer is suspected to be damaging the property (for example, eating blossoms near a hedge or in other parts of the property). Another event 540 associated with an animal object may also be tracked as a potentially harmful (digging holes and damaging the grass cover of the property).

Figure 6:
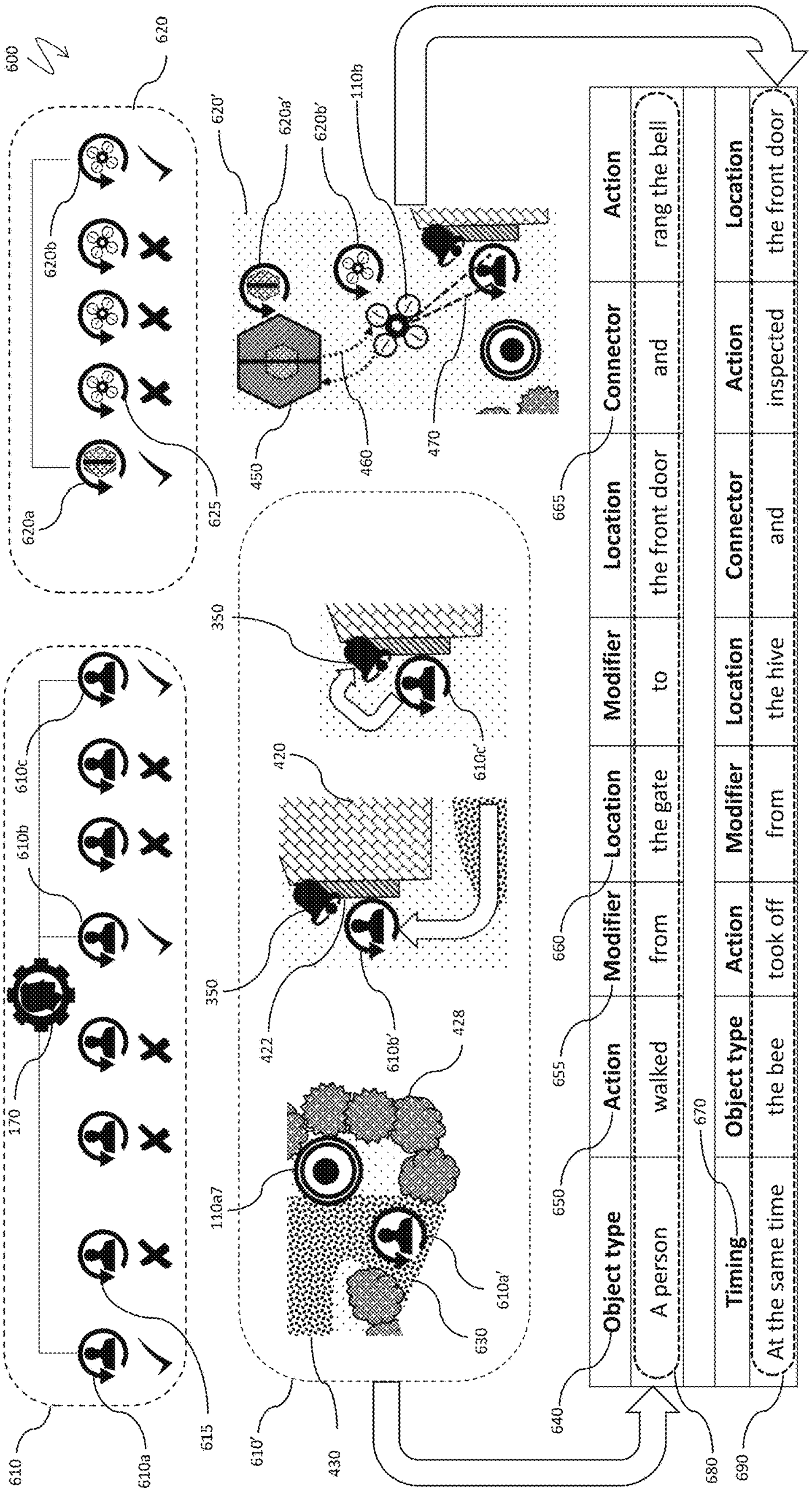
FIG. 6 is a schematic illustration of generating template-driven natural language descriptions of activities, according to an embodiment of the system described herein.

FIG. 6 is a schematic illustration 600 of generating template-driven natural language descriptions of activities. Each of two activities 610, 620 initially includes multiple connected events. Corresponding event sequences may be compressed by the semantic analysis component 170, as explained elsewhere herein, retaining only key events 610*a*, 610*b*, 610*c*, 620*a*, 620*b* and dropping intermediate less significant events 615, 625. The activities 610, 620 and the key events 610*a*, 610*b*, 610*c*, 620*a*, 620*b* are further illustrated by pictograms 610', 620' as follows:

The pictogram 610' includes three parts, each illustrating one key event of the activity 610. Specifically, a first part shows the initial event of the activity 610. An unknown person is entering a driveway (the event 430) on a property through a gate 630 made in the hedge 428. The person is detected by a sensor unit 110*a*7, which corresponds to an event 610*a*', a graphical illustration of the event 610*a*. The second part shows the next key event of the activity 610. Here, the unknown person walks around the house 420 and reaches the front door 422 with the doorbell 350, which corresponds to an event 610*b*', a graphical illustration of the event 610*b*. The final third part of the pictogram 610' shows the unknown person ringing the doorbell 350, which is captured by the system as an event 610*c*', a graphical representation of the event 610*c*.

The pictogram 620' illustrates the activity 620 on one image. Once the unknown person has reached the front door 422, the system logic decides to dispatch the multicopter 110*b* for an inspection flight. This includes opening the landing platform (hive) 450 so the multicopter 110*b* departs and travels along the aerial trajectory 460 until the multicopter 110*b* can clearly view the unknown person from the target position, as shown by the view angle 470. This activity corresponds to two key events 620*a*', 620*b*', the graphical representations of the key events 620*a*, 620*b*.

The bottom portion of FIG. 6 illustrates template-driven generation of natural language description of activities based on key events. Several types of template positions and fields are explained as object types 640, action names 650, modifiers 655, locations 660, logical connectors 665, and temporal (timing) expressions 670. Examples of natural language descriptions of activities as sequences of key events are presented by phrases 680, 690.

Figure 7:
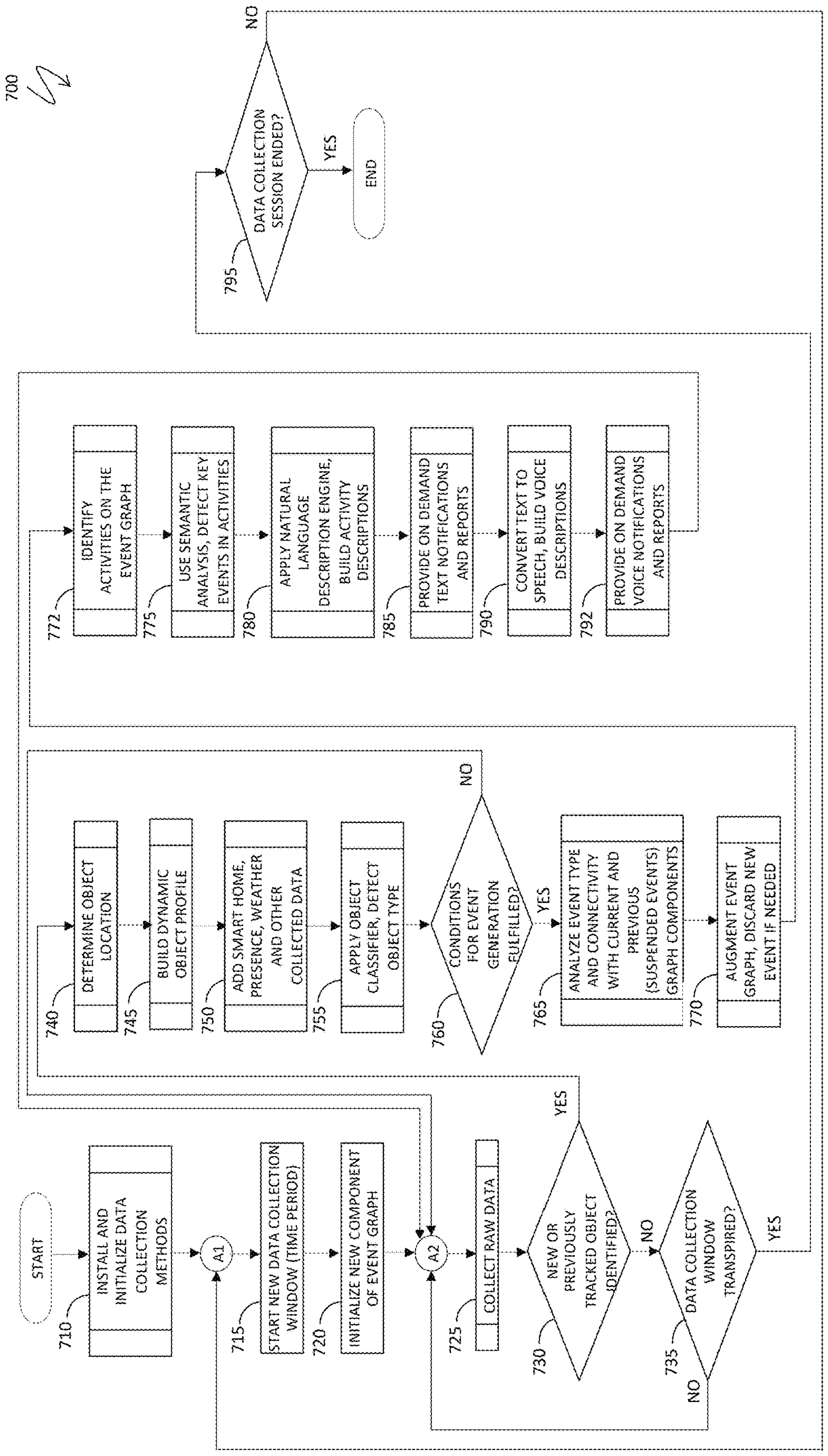
FIG. 7 is a system flow diagram illustrating system functioning in connection with data collection, identification and analysis of events and activities and generating corresponding natural language descriptions, according to an embodiment of the system described herein.

Referring to FIG. 7, a system flow diagram 700 illustrates system functioning in connection with data collection, identification and analysis of events and activities and generating of corresponding natural language descriptions. Processing begins at a step 710, where data collection mechanisms are installed and initialized, as explained elsewhere herein (see, in particular, FIG. 1 and the accompanying text). After the step 710, processing proceeds to a step 715, where a new data collection window is started. After the step 715, processing proceeds to a step 720, where the system initializes a new component of an event graph. After the step 720, processing proceeds to a step 725, where the system collects raw data captured by the data collection mechanisms. After the step 725, processing proceeds to a test step 730, where it is determined whether a new or previously tracked object has been identified. If not, processing proceeds to a test step 735, where it is determined whether the data collection window has transpired. If not, processing proceeds to the step 725, which may be independently reached from the step 720; otherwise, processing proceeds to a test step 795, where it is determined whether the data collection session ended. If so, processing is complete; otherwise, processing proceeds to the step 715, which may be independently reached from the step 710.

If it is determined at the test step 730 that a new or previously tracked object has been identified, processing proceeds to a step 740, where the object location is determined. After the step 740, processing proceeds to a step 745, where the system builds a dynamic object profile, as explained elsewhere herein (see, in particular, FIG. 2 and the accompanying text). After the step 745, processing proceeds to a step 750, where smart home, presence, weather, and other data are added to the object description (as explained, in particular, in connection with FIG. 2). After the step 750, processing proceeds to a step 755, where the system applies an object classifier to detect an object type (see FIG. 2). After the step 755, processing proceeds to a test step 760, where it is determined whether the conditions for event generation are fulfilled, as explained elsewhere herein. If not, processing proceeds to the step 725, which may be independently reached from the step 720 and the test step 735; otherwise, processing proceeds to a step 765, where the system analyzes the event type and connectivity with the current and previous components of the event graph (the previous components may be associated with previously suspended events), as explained, in particular, in connection with FIG. 1 and is exemplified by FIGS. 4B, 4C. After the step 765, processing proceeds to a step 770, where the system augments the event graph, discarding and potentially suspending the new event. After the step 770, processing proceeds to a step 772, where the system identifies activities on the event graph (see, for example, FIGS. 1, 5, 6). After the step 772, processing proceeds to a step 775, where the system uses semantic analysis to detect key events in activities (see, in particular, FIG. 6 and the accompanying text). After the step 775, processing proceeds to a step 780, where the natural language description engine is applied, and activity descriptions are built (an example of the template based natural language description engine and two activity descriptions are provided in FIG. 6 and the accompanying text).

After the step 780, processing proceeds to a step 785, where the system provides on demand text notifications and reports, as explained elsewhere herein, including FIG. 1. After the step 785, processing proceeds to a step 790, where the text may optionally be converted to a synthesized speech and voice descriptions of activities are created (see, in particular, FIG. 1 and the accompanying text). After the step 790, processing proceeds to a step 792, where the system provides on demand voice notifications and reports. After the step 792, processing proceeds to a step 725, which may be independently reached from the step 720 and the test steps 735, 760.

Figure 8A:
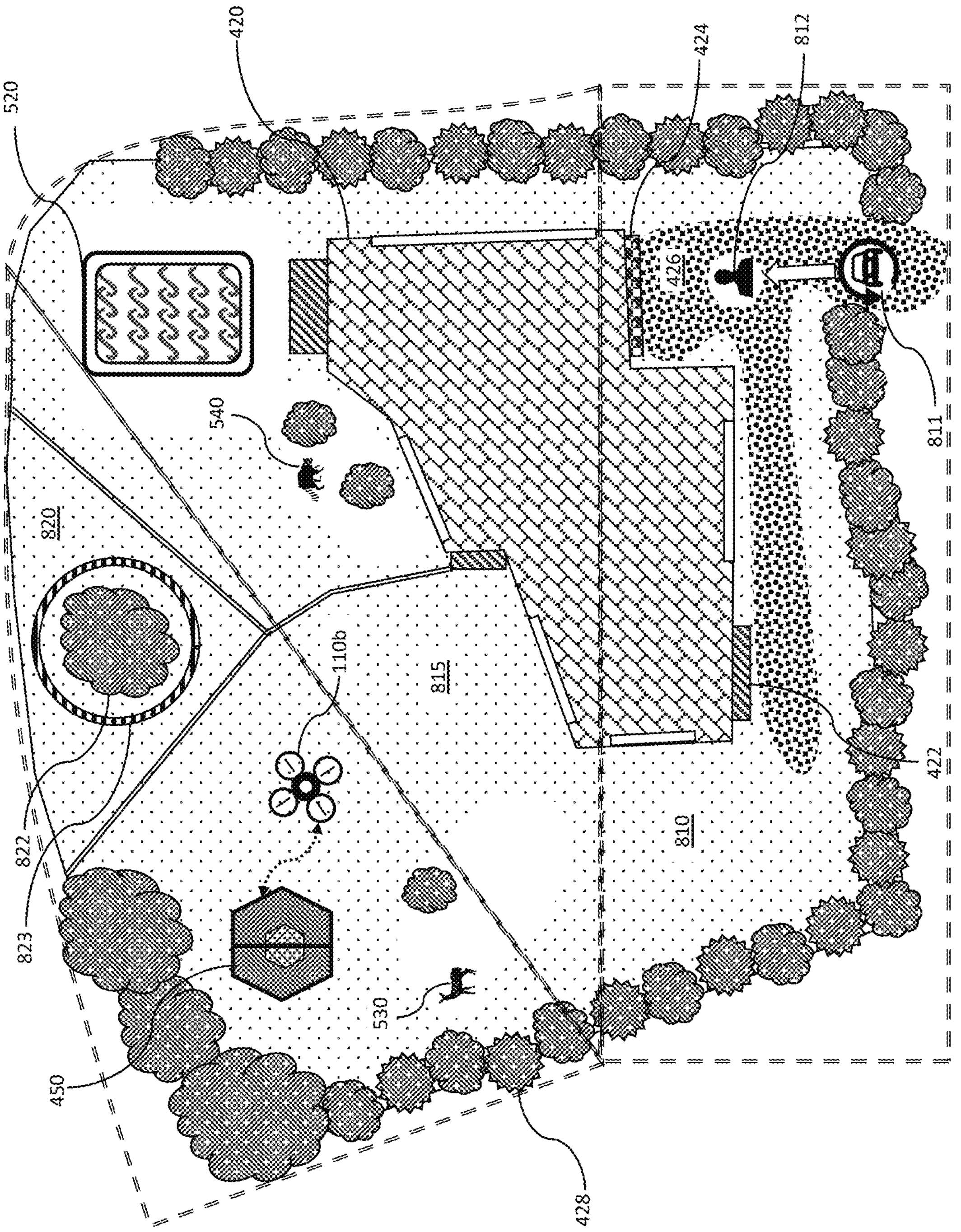
FIGS. 8A-8C are schematic illustrations of monitored spaces subdivided into multiple security zones, according to an embodiment of the system described herein.
Figure 8B:
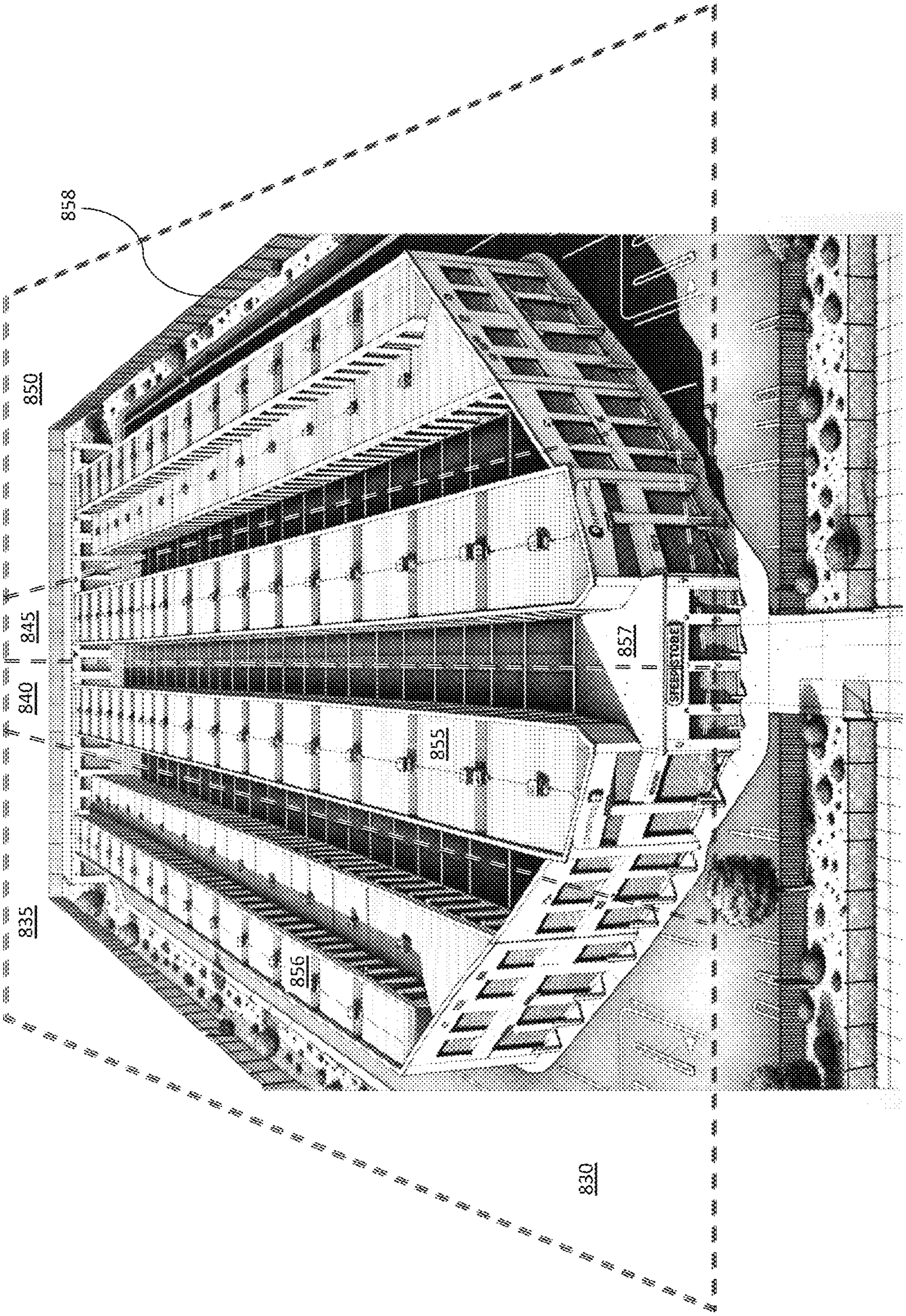
Figure 8C:
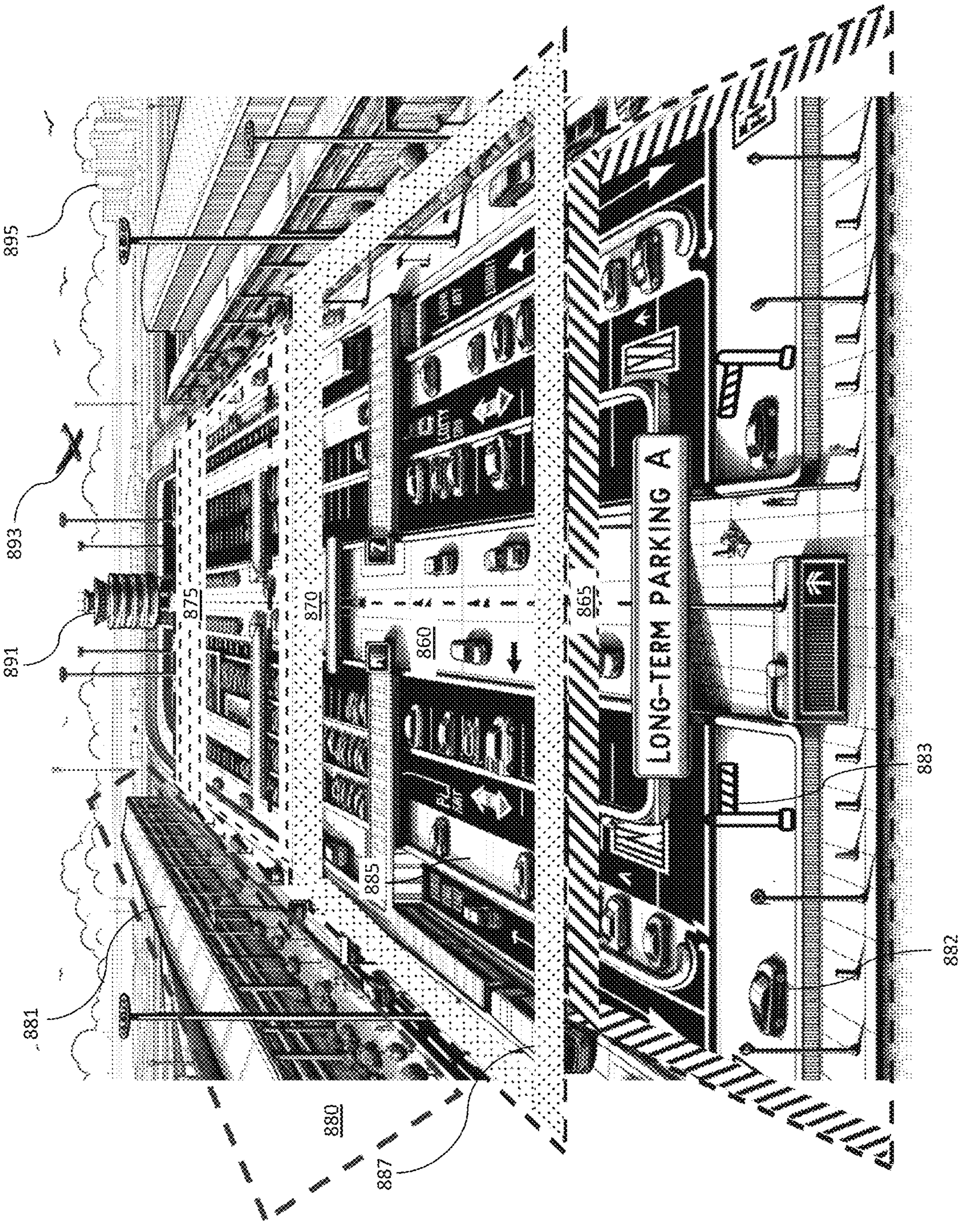

FIGS. 8A-8C are schematic illustrations of monitored spaces subdivided into multiple security zones.

FIG. 8A illustrates a monitored space based on the property map and description of FIG. 5. The property is subdivided into three security zones:

A rectangular security zone 810 includes part of the house 420 adjacent to the front door 422 and the garage door 424, the driveway 426, and a portion of the hedge 428 separating the property from the street.

A curved triangular-shaped security zone 815 includes the rest of the house 420, the pool 520, and another portion of the hedge 428.

Another curved triangular-shaped security zone 820 contains a big tree 822 surrounded by the fence 823 and the last portion of the hedge 428. The multicopter landing platform 450 housing the multicopter **110*b* are also located in the security zone 820**.

According to the above description, the set of permanent objects in the monitored space includes the house 420, the driveway 426, the hedge 428, the pool 520, the multicopter landing platform 450 with the multicopter **110*b*, and the tree 822 with the surrounding fence 823. The multicopter 110*b*** is the only dynamic permanent object, all other permanent objects are static.

The monitored space also includes several transitory objects: a car 811, a person (car driver) 812 who has just left the car 811, a deer associated with the event 530, and a racoon associated with the event 540. All transitory objects are dynamic (see Section B of the Summary for definitions and explanations).

FIG. 8B is a schematic illustration of a warehouse facility 830 with four security zones 835, 840, 845, 850 surrounding storage buildings 855 (two storage buildings have second store galleries 856); the facility has a main entrance 857 and an outside fence 858.

FIG. 8C is a schematic illustration of an airport parking lot 860 with four security zones, an entry/exit zone 865, a mid-section parking security zone 870, a remote parking security zone 875, and a last security zone 880. The entry/exit security zone 865 is followed by the mid-section parking security zone 870 and by the remote parking security zone 875 (all three intra-parking zones are illustratively shown in filled frames or a semi-frame); the last security zone 880 surrounds a terminal 881. Cars 882 entering the parking lot 860 through entry gates 883 and are parking in empty slots 885; the parking lot 860 is served by shuttle buses 887. A control tower 891, a landing plane 893 and a city skyline 895 are also shown in FIG. 8C.

Figure 9B:
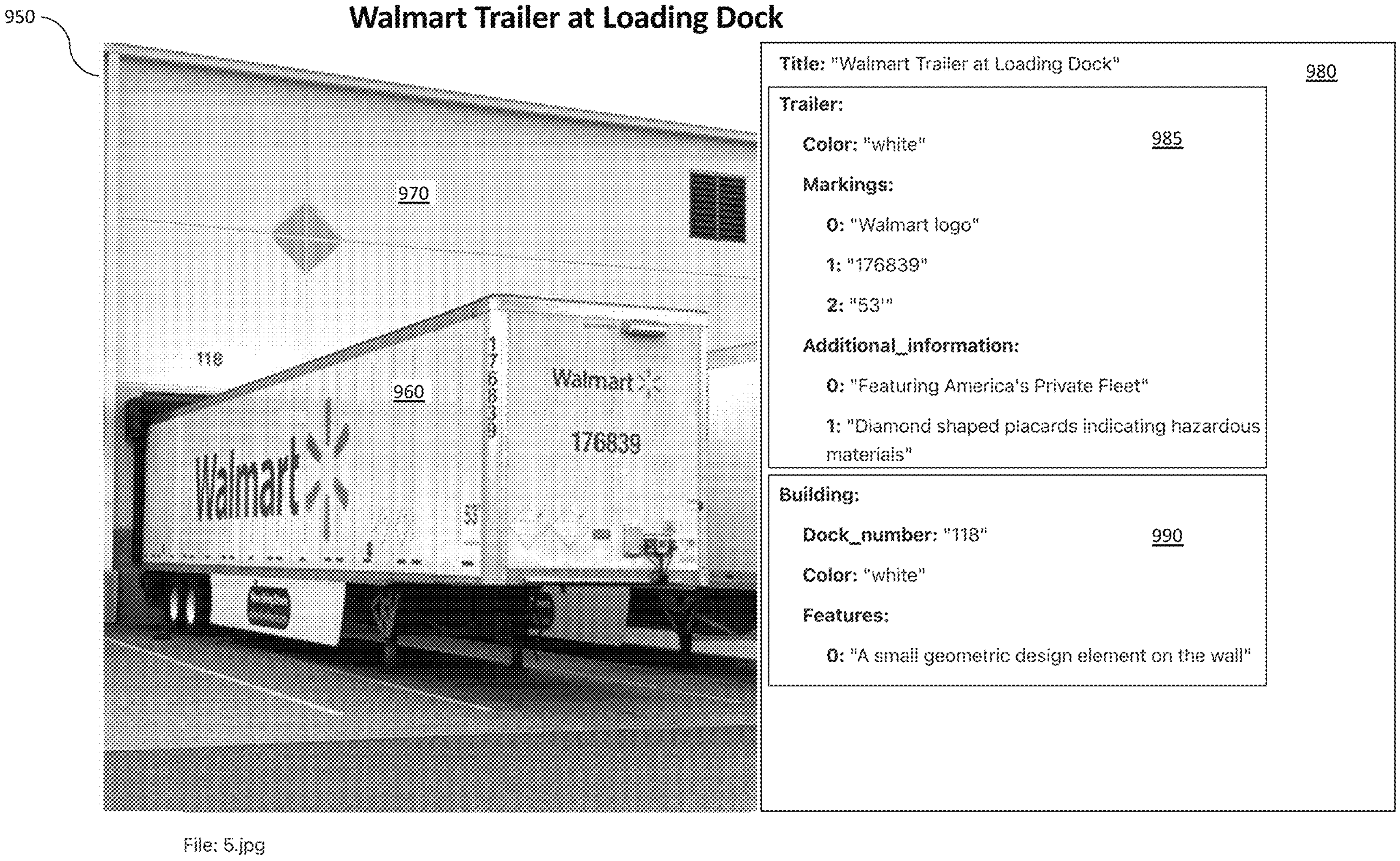

FIGS. 9A-9B are schematic illustrations of GenAI-based image analysis of photographs and the resulting structured and non-structured descriptions of the scenes.

FIG. 9A schematically illustrates GenAI-driven image analysis of a photograph with an unstructured description of a scene generated by a GenAI system such as the Open AI Vision GPT-4V. FIG. 9A shows an office building parking area 910 with cars 920, a tree line 925, an office building 930, and a group of people 935, adequately analyzed and presented in a screen description 940.

FIG. 9B schematically illustrates structured image analysis of a photograph showing a trailer 960 parked at a loading dock 970 of a warehouse. Scene analysis results 980 include two descriptions: a trailer description 985 showing color, markings (logo and numeric marks) and additional information on the trailer; a building description 990 includes recognized dock number, color, and an additional geometric design feature.

Figure 10:
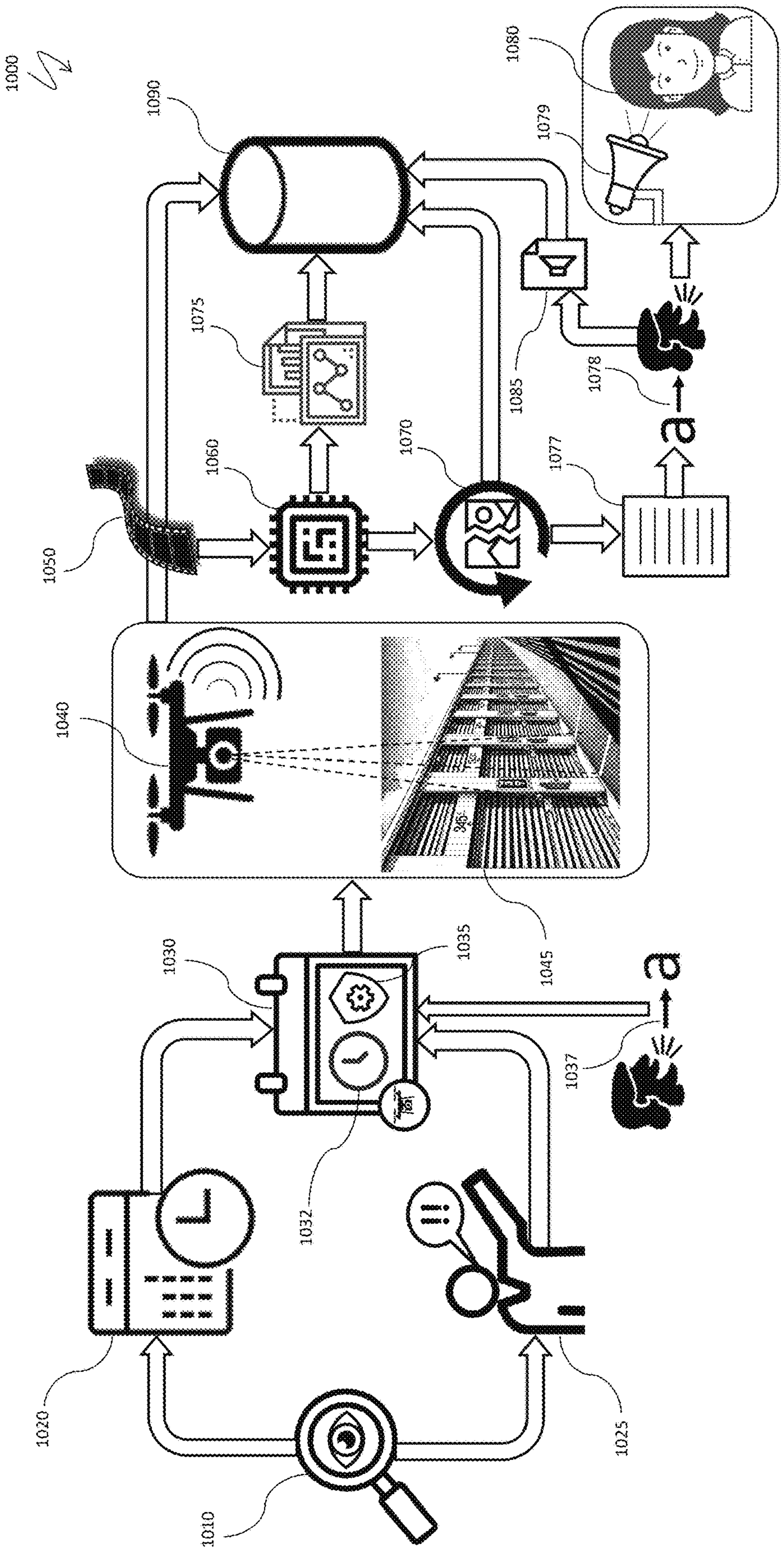
FIG. 10 is a schematic illustration of the multicopter-based security monitoring process, according to an embodiment of the system described herein.

FIG. 10 is a schematic illustration 1000 of a multicopter-based security monitoring process. The process includes three phases: planning and scheduling multicopter inspections on the left of FIG. 10, inspection flight in the middle of FIG. 10, and reporting on the right of FIG. 10. An inspection process 1010 branches into scheduled inspections 1020 and on-demand inspections 1025; each inspection type requires an inspection manifest 1030, which includes a timing portion 1032 and a flight plan or a specific task description 1035 (see Section E of the Summary for more information). Inspection manifests 1030 and components of the inspection manifest 1030, timing 1032 and task description 1035, may be entered by security personnel using voice input via natural language interface with voice recognition 1037 (an STT, Speech-to-Text conversion).

The inspection flight phase includes a scheduled or on-demand inspection that may be executed by a multicopter 1040 over a monitored space or a security zone 1045 (the security system may employ multiple multicopters for surveillance of the monitored space). Inspection results may be delivered in multiple formats. For example, original inspection videos 1050 may be saved to a security database 1090; the results may also be processed synchronously or asynchronously by a processing system 1060, which may retrieve image analytics 1075 (for example, GenAI-driven descriptions, explained elsewhere herein, see FIGS. 9A-9B for details) and subsequently save the image analytics 1075 to the database 1090. If a security event 1070, such as a damage event, has been discovered during the inspection or shortly after the inspection, the system may generate a natural language description of the security event 1070 (an alert), may further convert the natural language description to an audio stream using the TTS (text-to-speech) conversion, and may broadcast a specific alert 1079 to security personnel 1080 and other individuals and teams. Simultaneously, a textual natural language description 1077 of the alert 1079 and audio narration 1085 of the security event 1070 may be saved to the security database 1090.

Figure 11A:
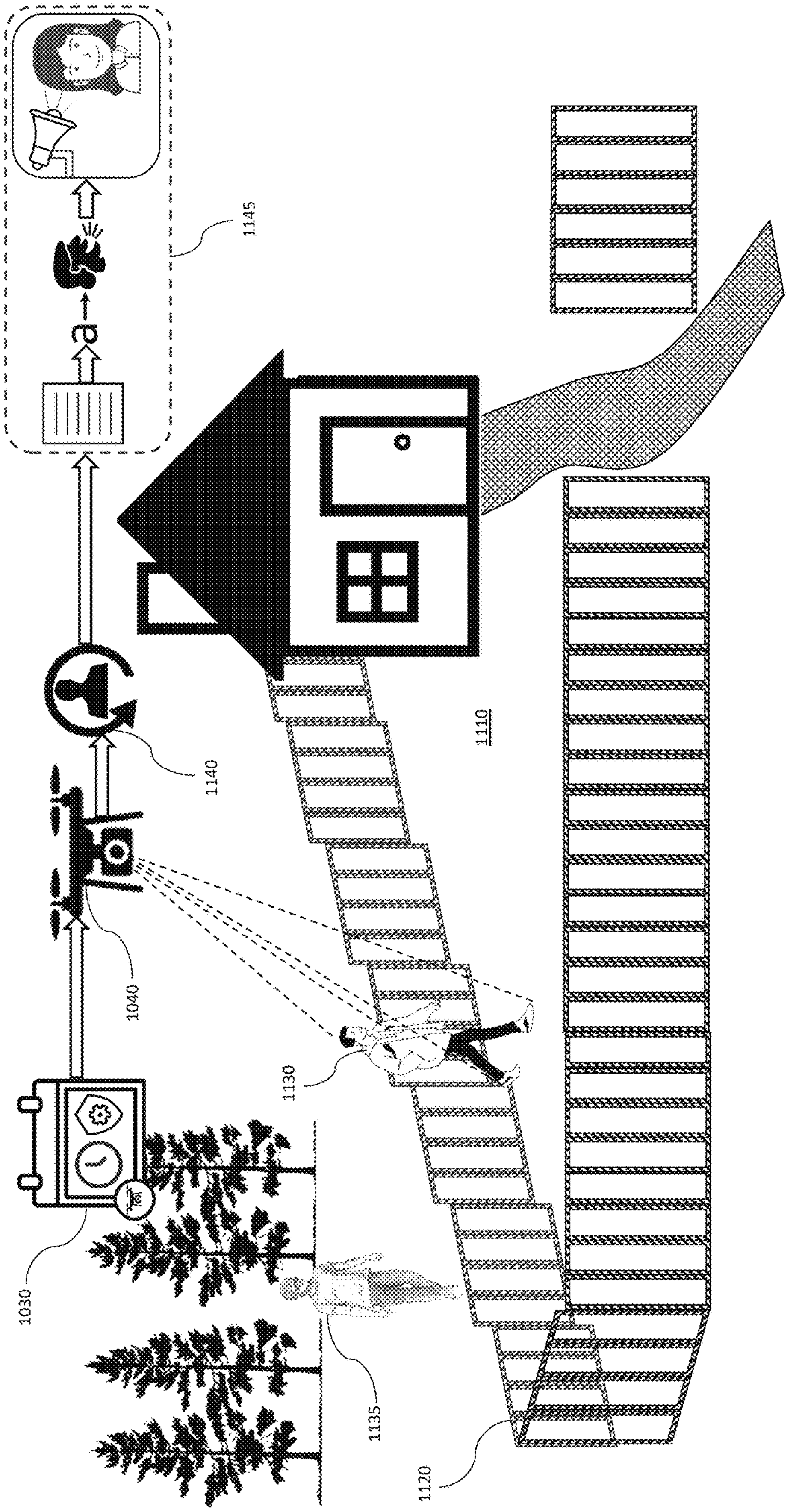
FIGS. 11A-11B are schematic illustrations of detection and reporting of security events during multicopter security inspections, according to an embodiment of the system described herein.
Figure 11B:
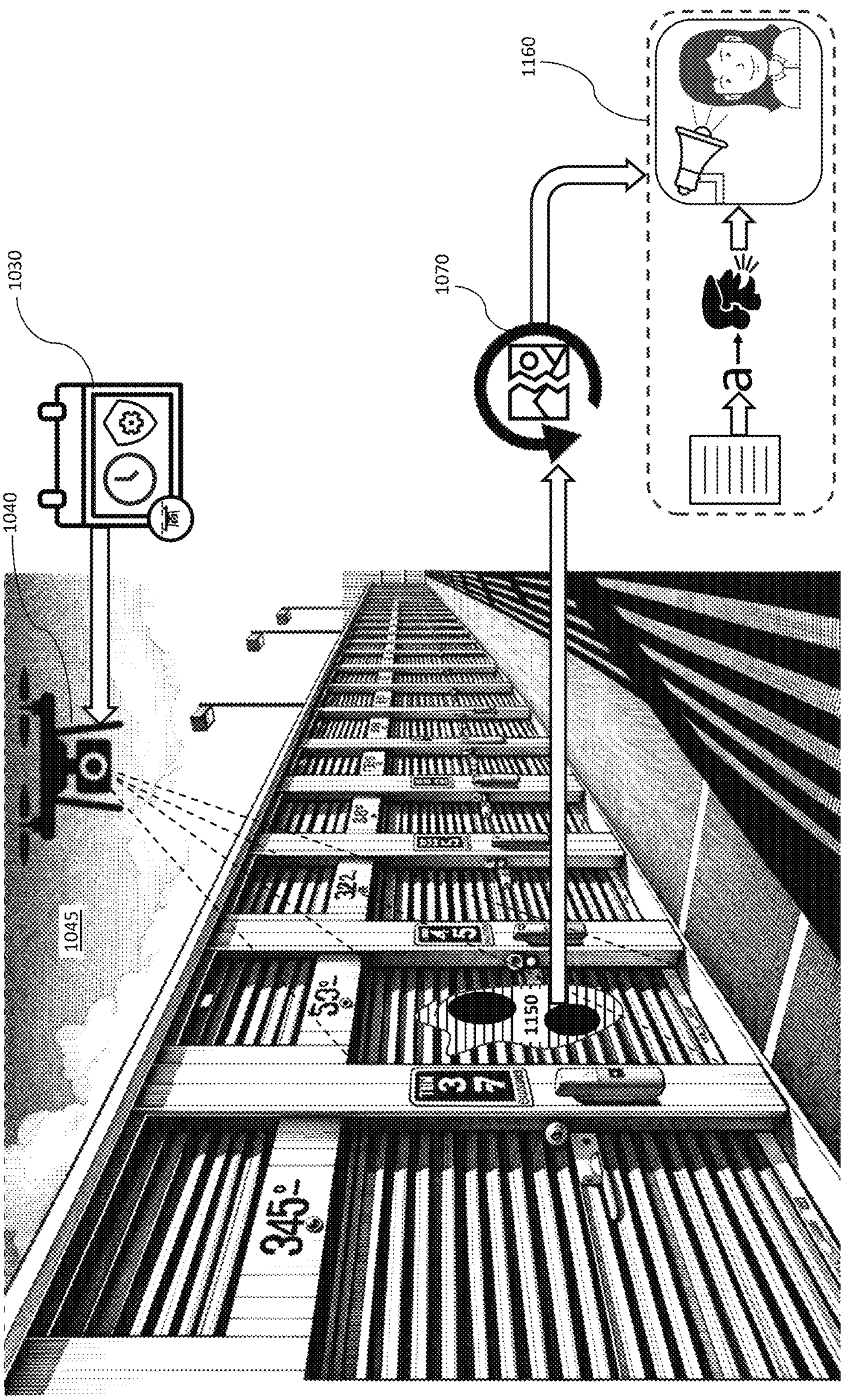

FIGS. 11A-11B are schematic illustrations of detection and reporting of security events during multicopter security inspections.

FIG. 11A shows a residential property 1110 surrounded by a fence 1120, which is breached by an individual 1130 and is approached by an individual 1135. A multicopter 1040 performs a regular scheduled security inspection with a flight manifest 1030 that is provided to detect security events according to a set of security rules for the monitored property (or a security zone), as explained elsewhere herein. Upon processing and analyzing the captured video data and discovering the breach, the system generates a security event 1140 of the type "perimeter breach by a person" and initiates an alert 1145 (analogous to the chain of items 1077-1080 in FIG. 10).

FIG. 11B shows the multicopter 1040 executing a scheduled security inspection with the regular security manifest 1030 over the security zone 1045 as shown in FIG. 10. The inspection discovers a severe damage 1150 to a door of one of the storage facility docks. Upon processing and analyzing the video data, the system generates a security event 1070 of the type "property damage" and initiates an alert 1160 (similar to items 1077-1080 in FIG. 10).

Figure 12:
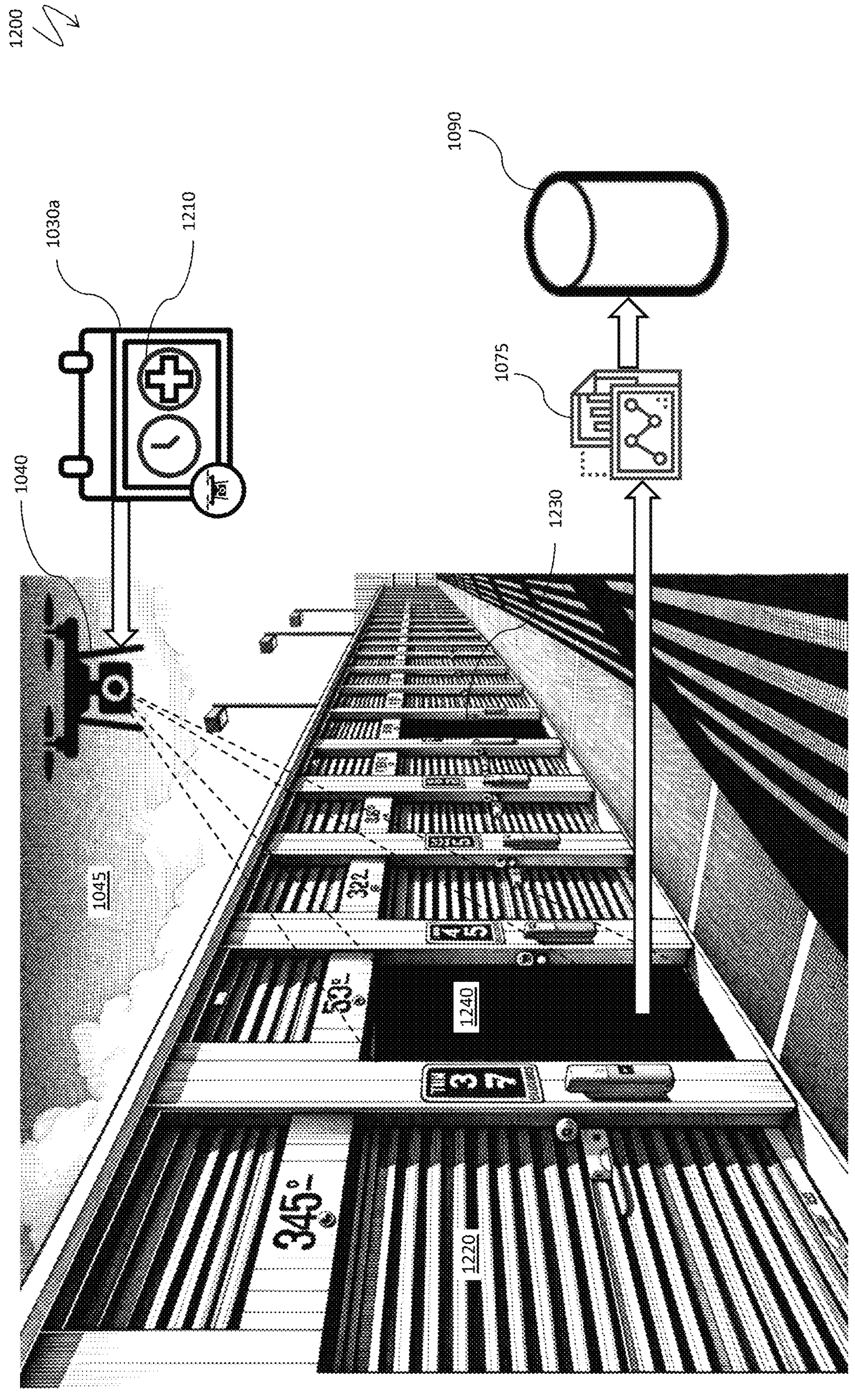
FIG. 12 is a schematic illustration of the targeted multicopter-based security monitoring, according to an embodiment of the system described herein.

FIG. 12 is a schematic illustration 1200 of targeted multicopter-based security monitoring. The multicopter 1040 of FIG. 10 and FIG. 11B performs an on-demand security inspection with a flight manifest **1030*a* and a flight plan 1210 instructing the multicopter 1040 and a corresponding processing system to capture video data from a flight over the security zone 1045 (shown in FIGS. 10, 11B) and count doors 1220 of the facility docks that are open. Upon executing the flight plan 1210, the multicopter 1040 transmits video data to a processing and image analysis system (not shown in FIG. 12), which identifies open doors 1230, 1240, generates the corresponding analytics 1075 and stores the analytics 1075 to the security database 1090**.

Figure 13:
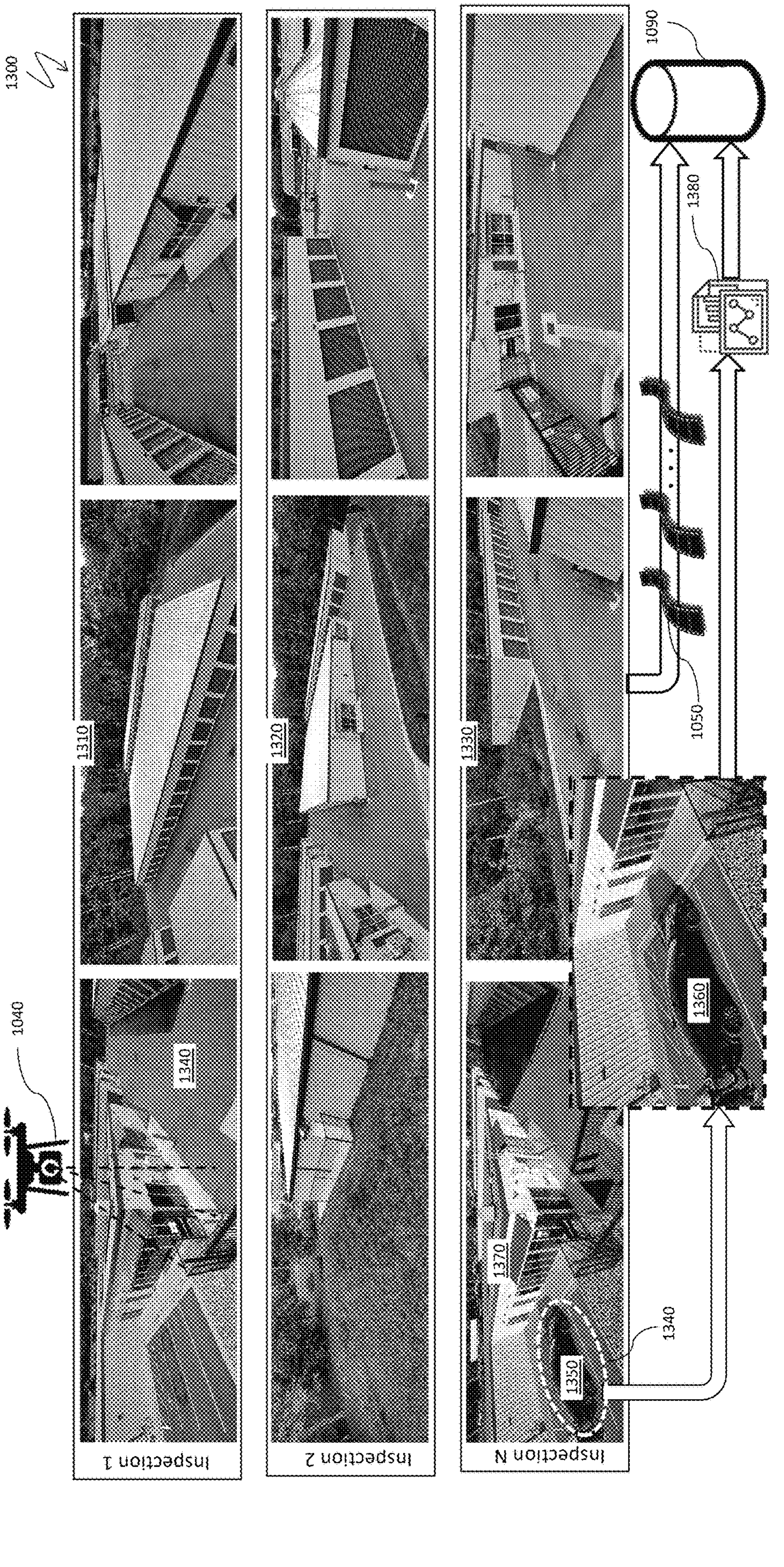
FIG. 13 is a schematic illustration of change detection via routine multicopter surveillance, according to an embodiment of the system described herein.

FIG. 13 is a schematic illustration 1300 of change detection via routine multicopter surveillance. The multicopter 1040 performs multiple similar inspection flights 1310 (Inspection 1), 1320 (Inspection 2), . . . , 1330 (Inspection N) over a same monitored space 1340 to generate a baseline and detect deviations from the baseline, as explained elsewhere herein (see Section H of the Summary for more information). Upon completing the series of the inspection flights

1310, 1320, 1330, the system compares and analyzes the captured videos 1050 (stored in the security database 1090), and detects a change 1350 from the baseline, whereby a previously absent car 1350 (enhanced in a magnified view 1360) is parked next to a building 1370. The system creates an analytics report 1380 with a natural language description of the change and other details of the routine multicopter surveillance (see FIGS. 9A-9B for more information) and stores the report to the security database 1090.

Figure 14:
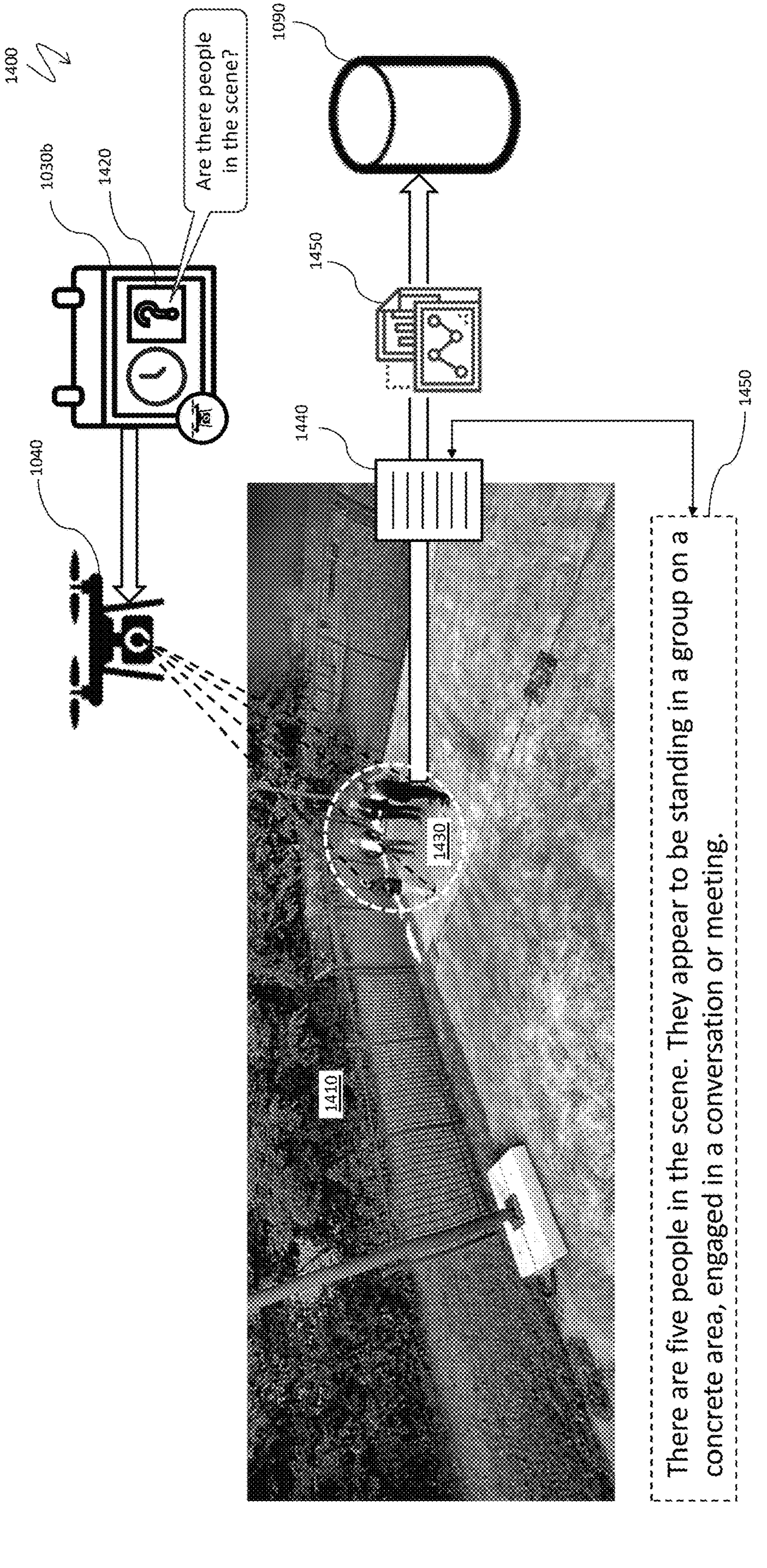
FIG. 14 is a schematic illustration of a customizable security query for a multicopter inspection, according to an embodiment of the system described herein.

FIG. 14 is a schematic illustration 1400 of a customizable security query for a multicopter inspection. The multicopter 1040 performs an on-demand security inspection over a security zone 1410 with a flight manifest 1030*b* and a flight plan 1420 in the form of a custom security query asking whether there are people in the scene. Upon processing the captured video, the system discovers a group of people 1430 in the scene and a natural language description 1440 with text 1450 is generated, included into an analytics report 1450, and saved to the security database 1090.

Figure 15:
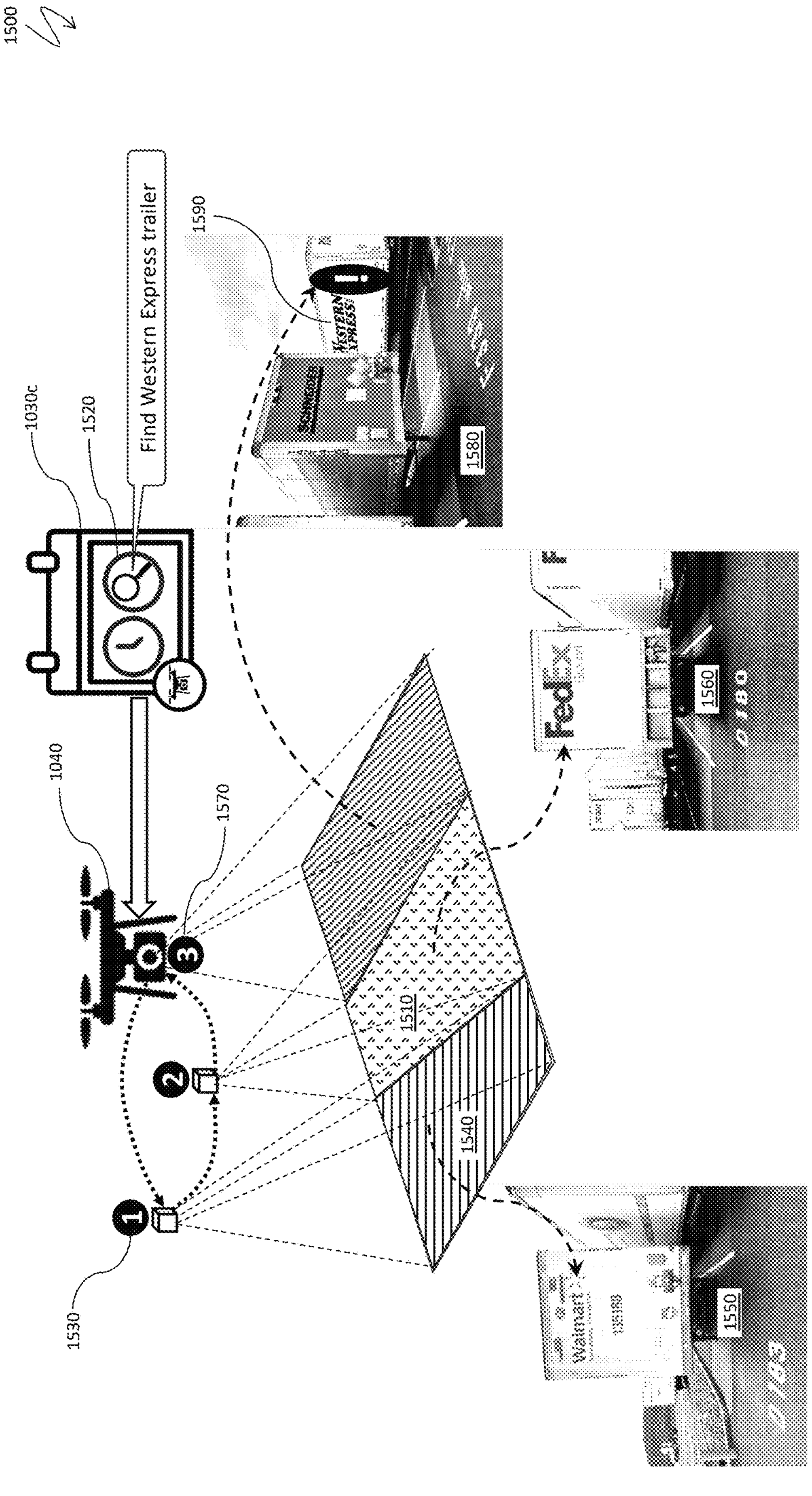
FIG. 15 is a schematic illustration of targeted search and recognition during multicopter inspections, according to an embodiment of the system described herein.

FIG. 15 is a schematic illustration 1500 of targeted search and recognition during multicopter inspections. The multicopter 1040 performs an on-demand security inspection over a monitored space 1510, a trailer parking lot, with a flight manifest 1030*c* and a flight plan 1520 in the form of an instruction to find a Western Express trailer in the monitored space. The system offers three strategic locations 1530 for positioning the multicopter 1040. The strategic locations provide for observing the lot by multicopter rotations, maneuvering around each strategic location, and flying between the locations 1530 so that from each of the three strategic locations the multicopter can observe one of three sub-areas 1540 of the monitored space 1510.

The first two of the locations 1530 allow the multicopter 1040 to retrieve videos 1550, 1560, which the system recognizes as trailers similar to the desired item; however, the trailers in the videos 1550, 1560 belong to other owners. Finally, after the multicopter 1040 has moved to a third one of the locations 1530 and captured a video of the area 1580, the system identifies a desired image of a trailer 1590 that corresponds to the desired item, which completes the task and fulfills the flight plan.

Figure 16:
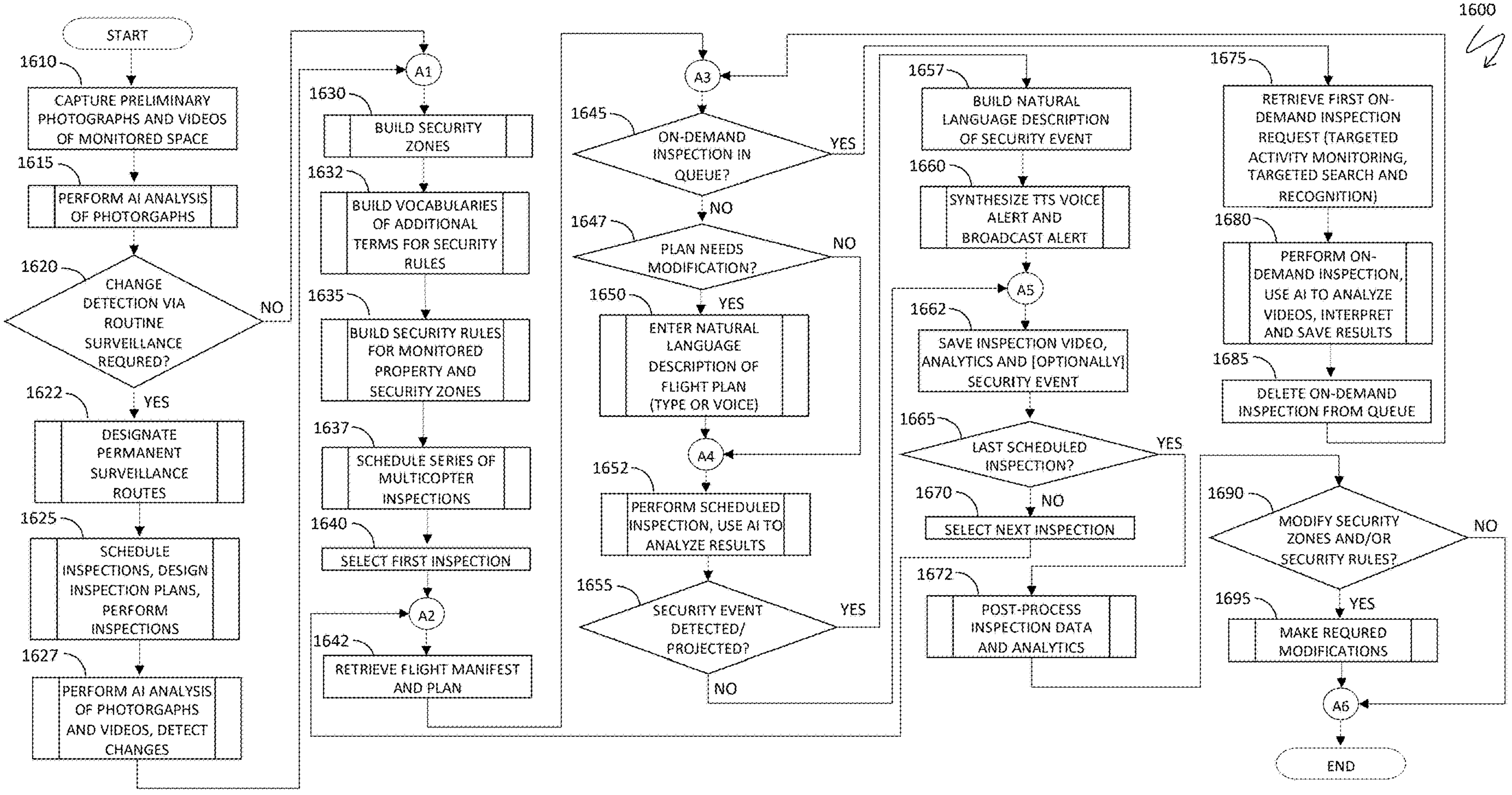
FIG. 16 is a system flow diagram illustrating system functioning in connection with multicopter-based security monitoring, according to an embodiment of the system described herein.

Referring to FIG. 16, a system flow diagram 1600 illustrates system functioning in connection with the multicopter-based security monitoring. Processing begins at a step 1610, where preliminary photographs and videos of the monitored space are taken. After the step 1610, processing proceeds to a step 1615, where a GenAI analysis of the collected photographs and/or videos is performed (see FIGS. 9A-9B for illustrations and more information). At the step 1615, lists of permanent objects, preliminary lists of transitory objects, object attributes, interactions between objects, and object behaviors are created. After the step 1615, processing proceeds to a test step 1620, where it is determined whether change detection via routine surveillance is required to set up the initial security rules for the monitored space. If so, processing proceeds to a step 1622, where the permanent surveillance routes for a multicopter (or multiple multicopters) are designated. After the step 1622, processing proceeds to a step 1625, where routine surveillance inspections are scheduled, inspection (flight) plans and manifests are designed and routine surveillance is performed. After the step 1625, processing proceeds to a step 1627, where the GenAI analysis of photographs and videos collected during the routine surveillance is performed, and changes in the scenes are detected, as explained elsewhere herein (see FIG. 13 for details).

After the step 1627, processing proceeds to a step 1630, where the system builds security zones for the monitored space (if any). Note that the step 1630 may be independently reached from the test step 1620 if it is determined that change detection via routine surveillance is not required. After the step 1630, processing proceeds to a step 1632, where vocabularies of additional terms are built for use in the original security rules, reflecting information and knowledge of the monitored space and security zones acquired through the preliminary exploration (including, if available, additional information from change detection via routine surveillance. After the step 1632, processing proceeds to a step 1635, where the previously acquired information is used to build security rules for the monitored property and the security zones. After the step 1635, processing proceeds to a step 1637, where a series of multicopter inspections is scheduled (see FIG. 10 and Section E of the Summary for explanations). After the step 1637, processing proceeds to a step 1640, where the first scheduled inspection is selected. After the step 1640, processing proceeds to a step 1642, where the flight manifest and plan are retrieved. After the step 1642, processing proceeds to a test step 1645, where it is determined whether there are on-demand inspection requests in the inspection queue (note that on-demand inspections have priority over scheduled inspections). If not, processing proceeds to a test step 1647, where it is determined whether the flight plan needs modifications. If so, processing proceeds to a step 1650 where a natural language description of the flight plan (or modifications to the original plan) is entered via keyboard or voice input.

After the step 1650, processing proceeds to a step 1652, where the scheduled inspection flight is executed, video data from the executed inspection flight is collected and transmitted to the processing component of the system (or processed, partially or fully, on-board), and the GenAI analysis of the obtained inspection materials is performed, as explained elsewhere herein (see FIGS. 10, 11A-11B for more information). Note that the step 1652 may be independently reached from the test step 1647 if it is determined that the flight plan does not need modifications.

After the step 1652, processing proceeds to a test step 1655, where it is determined whether a security event is detected or projected based on video data collected during the inspection flight. If so, processing proceeds to a step 1657 where natural language descriptions of the security event are created. After the step 1657, processing proceeds to a step 1660, where voice alerts using Text-to-Speech conversion are synthesized and voice alerts are broadcasted (see FIGS. 10, 11A-11B for explanations and examples). After the step 1660, processing proceeds to a step 1662, where inspection videos, analytics built at the step 1652, and a security event (if available) are saved in the security database (see FIG. 10 for details). Note that the step 1662 may be independently reached from the test step 1655 if it is determined that the security event was not detected or projected during the inspection flight.

After the step 1662, processing proceeds to a test step 1665, where it is determined whether the current inspection is the last scheduled inspection in the series. If not, processing proceeds to a step 1670, where the next scheduled inspection is selected. After the step 1670, processing proceeds back to the step 1642, discussed above, which may be independently reached from the step 1640. If it is determined at the test step 1665 that the current inspection is the last scheduled inspection in the series, processing proceeds to a step 1672 where the system post-processes inspection data and analytics for all inspections in the series. After the step 1672, processing proceeds to a test step 1690, where it is determined whether modifications of security zones and/or security rules are needed based on the results of post-processing. If so, processing proceeds to a step 1695, where recommended modifications are made; otherwise, processing is complete. After the step 1695, processing is also complete.

If it is determined at the test step 1645 that there are on-demand inspection requests in the dedicated inspection queue, processing proceeds to a step 1675, where the first on-demand inspection in the queue is retrieved; examples may include targeted activity monitoring, targeted search and recognition, customizable security query (see FIGS. 12, 14, 15 for more information). After the step 1675, processing proceeds to a step 1680, where the retrieved on-demand inspection is performed, video data from the retrieved on-demand inspection is analyzed using the GenAI component of the system, and the results are interpreted and saved, along with the raw video data. After the step 1680, processing proceeds to a step 1685, where the executed on-demand inspection is deleted from the queue. After the step 1685, processing proceeds to the test step 1645, which may be independently reached from the step 1642; in this way, on-demand inspection requests are prioritized and executed until there are no such requests left in the current queue, so the inspection process returns to scheduled inspections.

Note that, although the system described herein has been illustrated using a multicopter 1040, it will be appreciated by one of ordinary skill in the art that the invention may be implemented using other types of UAVs (unmanned aerial vehicles) that provide the functionality described herein. Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets, and other mobile computers. Mobile devices, such as smartphones and tablets, may use operating system(s) selected from the group consisting of: iOS, Android OS, Windows Phone OS, Blackberry OS, and mobile versions of Linux OS. Mobile computers and tablets may also use operating system selected from the group consisting of Mac OS, Windows OS, Linux OS, Chrome OS. Portions of the system may be implemented on cloud servers and communicate with mobile devices and vehicles via wireless connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of conducting surveillance in an area, comprising:
  - a UAV (Unmanned Aerial Vehicle) with a camera flying over specific portions of the area and capturing specific visual data based on a first flight plan that causes the UAV to fly over the specific portions of the area and capture the specific visual data;
  - providing natural language input for a customizable security query corresponding to a targeted instruction for an on-demand inspection or a specific question;
  - using generative artificial intelligence (AI) to interpret the natural language input to reflect the instruction or question corresponding to the customizable security query;
  - creating a second flight plan that is based on the customizable security query, the second flight plan being different from the first flight plan according to at least one of: the specific portions of the area that the UAV flies over or the specific visual data to be captured by the UAV; and
  - using the generative AI to analyze the visual data provided by the UAV to derive results of surveillance of the area that include a report that is a response to the customizable security query and is based on visual data captured by the UAV while executing the second flight plan.

2. The method of claim 1, wherein the customizable security query causes different visual data to be captured.

3. The method of claim 1, wherein the natural language input alters or replaces at least one security rule that is used to generate security events based on the visual data.

4. The method of claim 1, wherein a user provides the natural language input verbally.

5. The method of claim 4, wherein verbal input by the user is converted to text prior to the generative AI interpreting the natural language input.

6. The method of claim 1, wherein the natural language input is a specific question for a count of specific items at a specific location.

7. The method of claim 6, wherein the specific items are vehicles.

8. The method of claim 6, wherein the specific items are storage containers.

9. The method of claim 1, wherein the UAV is a multicopter.

10. A method of creating or modifying security rules that are used to detect security events in an area based on initial visual data from a UAV (Unmanned Aerial Vehicle) that flies over portions of the area, comprising:
  - generating an initial flight plan that directs the UAV to fly over initial portions of the area to capture the initial visual data;
  - the UAV collecting the initial visual data while flying over the initial portions of the area according to the initial flight plan;
  - using generative artificial intelligence (AI) to analyze the initial visual data and detect suspicious activity therein at specific ones of the portions of the area based on the visual data;

creating or modifying the security rules to detect security events based on the initial visual data from the portions of the area in response to the generative AI detecting suspicious activities; and revising the initial flight plan to provide a revised flight plan that causes the UAV to fly over other portions of the area that are different from the initial portions of the area and/or to capture other visual data that is different from the initial visual data in response to the generative AI detecting the suspicious activity using the initial visual data.

11. The method of claim 10, further comprising:

dispatching the UAV to fly over specific ones of the portions of the area to capture the other visual data in response to the generative AI detecting the suspicious activity.

12. The method of claim 10, further comprising:

using generative AI to establish a baseline of visual data and activity for the area; and creating or modifying the security rules in response to the visual data and/or the activity for the area deviating significantly from the baseline.

13. The method of claim 10, wherein the UAV is a multicopter.

14. The method of claim 1, wherein the report is at least one of: textual, visual, and/or audio.

15. A non-transitory computer readable medium containing software that, when executed by a processor, conducts surveillance in an area having a UAV (Unmanned Aerial Vehicle) with a camera flying over specific portions of the area and capturing specific visual data based on a first flight plan that causes the UAV to fly over the specific portions of the area and capture the specific visual data, the software comprising:

executable code that receives natural language input for a customizable security query corresponding to a targeted instruction for an on-demand inspection or a specific question;

executable code that uses generative artificial intelligence (AI) to interpret the natural language input to reflect the instruction or question corresponding to the customizable security query;

executable code that creates a second flight plan that is based on the customizable security query, the second flight plan being different from the first flight plan according to at least one of: the specific portions of the area that the UAV flies over or the specific visual data to be captured by the UAV; and executable code that uses the generative AI to analyze the visual data provided by the UAV to derive results of surveillance of the area that include a report that is a response to the customizable security query and is based on visual data captured by the UAV while executing the second flight plan.

16. The non-transitory computer readable medium of claim 15, wherein the customizable security query causes different visual data to be captured.

17. The non-transitory computer readable medium of claim 15, wherein the natural language input alters or replaces at least one security rule that is used to generate security events based on the visual data.

18. The non-transitory computer readable medium of claim 15, wherein a user provides the natural language input verbally.

19. The non-transitory computer readable medium of claim 18, wherein verbal input by the user is converted to text prior to the generative AI interpreting the natural language input.

20. The non-transitory computer readable medium of claim 15, wherein the natural language input is a specific question for a count of specific items at a specific location.

21. The non-transitory computer readable medium of claim 20, wherein the specific items are vehicles and/or storage containers.

22. The non-transitory computer readable medium of claim 15, wherein the UAV is a multicopter.

* * * * *